(12) United States Patent
Maki et al.

(10) Patent No.: US 12,489,375 B2
(45) Date of Patent: Dec. 2, 2025

(54) POWER CONVERSION APPARATUS INCLUDING UPPER AND LOWER ARM CIRCUITS AND A FLYING CAPACITOR

(71) Applicant: KABUSHIKI KAISHA TOSHIBA, Tokyo (JP)

(72) Inventors: Koji Maki, Kanagawa (JP); Hiroshi Mochikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 116 days.

(21) Appl. No.: 18/158,503

(22) Filed: Jan. 24, 2023

(65) Prior Publication Data
US 2023/0308030 A1 Sep. 28, 2023

(30) Foreign Application Priority Data

Mar. 24, 2022 (JP) ................. 2022-048048

(51) Int. Cl.
*H02M 7/483* (2007.01)
*H02M 1/00* (2006.01)
*H02M 7/5387* (2007.01)

(52) U.S. Cl.
CPC ....... *H02M 7/4837* (2021.05); *H02M 1/0095* (2021.05); *H02M 7/5387* (2013.01)

(58) Field of Classification Search
CPC ............ H02M 7/42; H02M 7/44; H02M 7/48; H02M 7/483; H02M 7/4833; H02M 7/4835; H02M 7/4837; H02M 7/487; H02M 7/49; H02M 7/537; H02M 7/5387; H02M 7/53871; H02M 7/53873; H02M 7/53875;
(Continued)

(56) References Cited

U.S. PATENT DOCUMENTS

2020/0350832 A1  11/2020  Maki et al.
2021/0242768 A1  8/2021   Ishikura
(Continued)

FOREIGN PATENT DOCUMENTS

JP    2007282334 A  * 10/2007
JP    2018182951 A    11/2018
(Continued)

OTHER PUBLICATIONS

English translation of JP-2007282334-A. (Year: 2007).*
(Continued)

*Primary Examiner* — Thienvu V Tran
*Assistant Examiner* — Carlos O Rivera-Perez
(74) *Attorney, Agent, or Firm* — Maier & Maier, PLLC

(57) ABSTRACT

An apparatus according to an embodiment includes upper arm circuits, lower arm circuits and a flying capacitor. Each of the upper arm circuits is configured in such a manner that one or more first switch circuits each including a first switching element are connected in series. Each of the lower arm circuits is configured in such a manner that one or more second switch circuits each including a second switching element are connected in series. The apparatus includes a first circuit configured to cause a capacitor to be connected in parallel with the power storage via the first switching element; and a second circuit configured to cause a capacitor to be connected in parallel with the power storage via the second switching element.

7 Claims, 6 Drawing Sheets

(58) Field of Classification Search
CPC .. H02M 7/539; H02M 7/5395; H02M 1/0048; H02M 1/0051; H02M 1/0054; H02M 1/0067; H02M 1/007; H02M 1/0085; H02M 1/0095; H02M 1/32; H02M 1/34; H02M 1/342; H02M 1/344; H02M 1/346; H02M 1/348
USPC ............ 363/15–17, 40–43, 50, 56.12, 123, 363/131–139; 323/271–276, 282, 351
See application file for complete search history.

(56) References Cited

U.S. PATENT DOCUMENTS

| | | | | |
|---|---|---|---|---|
| 2021/0367532 | A1* | 11/2021 | Kidera | H02M 7/4837 |
| 2022/0286049 | A1 | 9/2022 | Fujii | |

FOREIGN PATENT DOCUMENTS

| | | | |
|---|---|---|---|
| JP | 2020108326 | A | 7/2020 |
| JP | 2020156163 | A | 9/2020 |
| JP | 2021016242 | A | 2/2021 |
| JP | 2021087263 | A | 6/2021 |
| JP | 6919771 | B2 | 8/2021 |
| WO | 2021033412 | A1 | 2/2021 |

OTHER PUBLICATIONS

Mochikawa et al., "High-efficiency circuit technology that contributes to the miniaturization and weight reduction of power converters", IEEJ, Industry Applications Society Conference, 3-S6-4, 2021, 14 pages.

Maki et al., "A Small and High Efficiency Circuit Topology with Significantly Improved Trade-off Between Switching Losses and dv/dt for Series Connected Devices with Regenerative Snubber Circuits", Translated from IEEJ Transactions on Industry Applications, vol. 142, No. 6, pp. 480-487, 2022, 8 pages.

Extended Search Report issued on Jul. 24, 2023, in corresponding European Application No. 23153867.9, 11 pages.

Kim et al., "A Generalized Undeland Snubber for Flying Capacitor Multilevel Inverter and Converter", IEEE Transactions on Industrial Electronics, Dec. 2004, vol. 51, No. 6, 7 pages.

Office Action issued on Oct. 21, 2025, in corresponding Japanese Application No. 2022-048048, 6 pages.

* cited by examiner

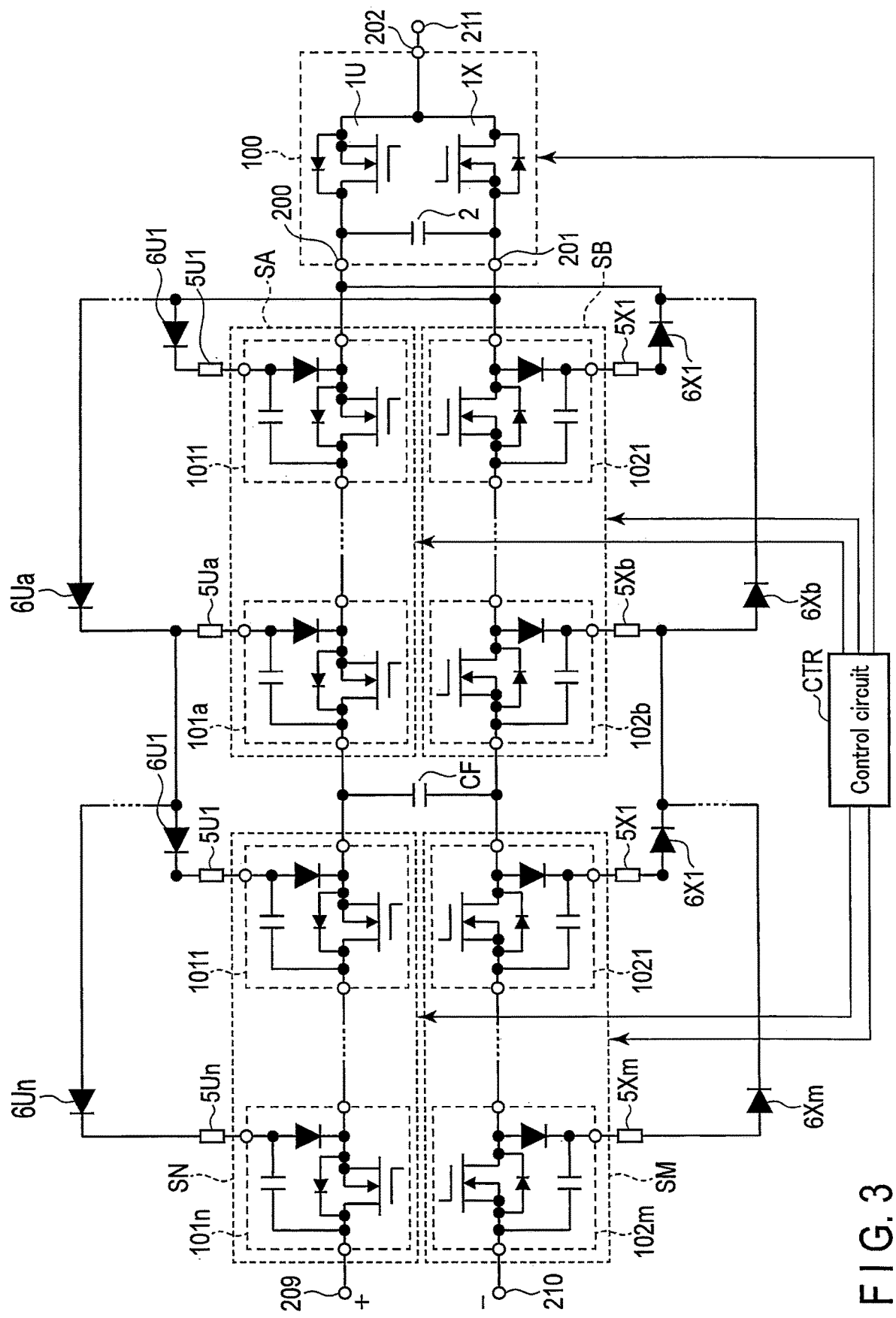
F I G. 3

POWER CONVERSION APPARATUS INCLUDING UPPER AND LOWER ARM CIRCUITS AND A FLYING CAPACITOR

CROSS-REFERENCE TO RELATED APPLICATIONS

This application is based upon and claims the benefit of priority from Japanese Patent Application No. 2022-048048, filed Mar. 24, 2022; the entire contents of which are incorporated herein by reference.

FIELD

Embodiments described herein relate generally to a power conversion apparatus.

BACKGROUND

In recent years, a multi-level power conversion apparatus capable of outputting multi-level voltages has been proposed. The multi-level power conversion apparatus is capable of being of a reduced size and of having an improved efficiency, compared to the general two-level power conversion apparatus.

A multi-level power conversion apparatus including a flying capacitor, for example, is, in principle, capable of charging and discharging the flying capacitor uniformly, and need not be provided with an additional circuit for balancing the capacitor voltage. Since such a flying capacitor is charged and discharged depending on a PWM carrier frequency, the voltage pulsation of the flying capacitor can be further decreased by increasing the PWM carrier frequency, thus decreasing the capacity of the flying capacitor and achieving a reduction in the size of the apparatus.

On the other hand, there is a limit to the reduction in the size of the apparatus, since an increase in switching frequency of the multi-level power conversion apparatus including a flying capacitor causes the need to increase the size of a cooler for reducing the heat caused by a switching loss, leading to a tradeoff between the switching loss and the capacity of the flying capacitor.

BRIEF DESCRIPTION OF THE DRAWINGS

FIG. 3 is a diagram schematically showing a configuration example of a power conversion apparatus according to a second embodiment.

DETAILED DESCRIPTION

A power conversion apparatus according to an embodiment includes a power storage; an upper arm including, between an alternating-current terminal and a positive direct-current terminal, a first upper arm circuit and a second upper arm circuit connected in series; a lower arm including, between the alternating-current terminal and a negative direct-current terminal, a first lower arm circuit and a second lower arm circuit connected in series; and a flying capacitor electrically connected, between the first upper arm circuit and the second upper arm circuit, to the upper arm, and electrically connected, between the first lower arm circuit and the second lower arm circuit, to the lower arm. Each of the first upper arm circuit and the second upper arm circuit is configured in such a manner that one or more first switch circuits each including a first switching element are connected in series, each of the first lower arm circuit and the second lower arm circuit is configured in such a manner that one or more second switch circuits each including a second switching element are connected in series, at least one of the first switch circuits includes a first capacitor connected in parallel with the first switching element, or at least one of the second switch circuits includes a second capacitor connected in parallel with the second switching element. The power conversion apparatus further includes a first regenerative rectification circuit configured, if at least one of the first switch circuits includes a first capacitor connected in parallel with the first switching element, to cause the first capacitor to be connected in parallel with the power storage via the first switching element; and a second regenerative rectification circuit configured, if at least one of the second switch circuits includes a second capacitor connected in parallel with the second switching element, to cause the second capacitor to be connected in parallel with the power storage via the second switching element.

Hereinafter, power conversion apparatuses according to multiple embodiments will be described in detail with reference to the accompanying drawings.

Figure 1:
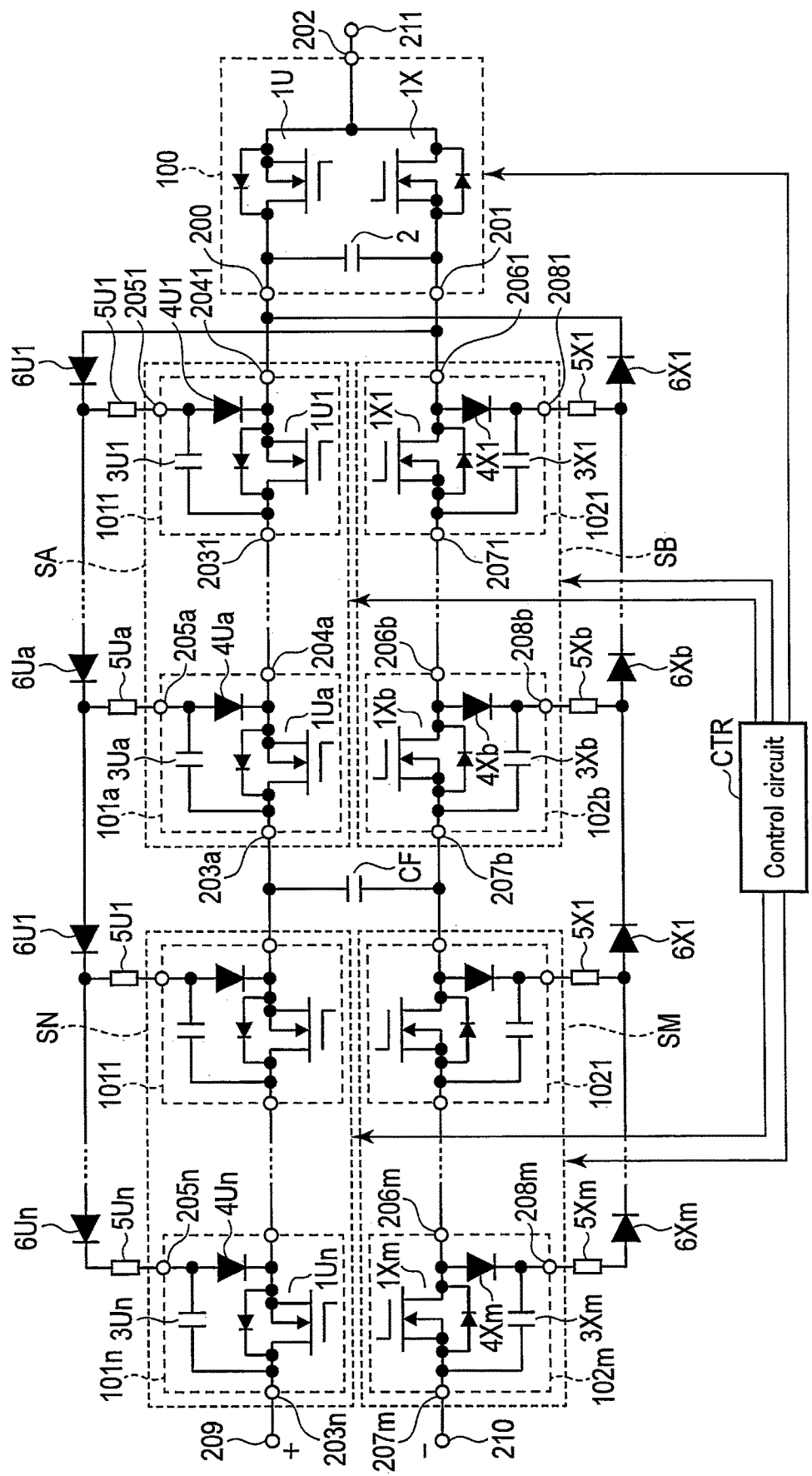
FIG. 1 is a diagram schematically showing a configuration example of a power conversion apparatus according to a first embodiment.

FIG. 1 is a diagram schematically showing a configuration example of a power conversion apparatus according to a first embodiment.

The power conversion apparatus according to the present embodiment is, for example, a three-level flying-capacitor-type power conversion apparatus capable of performing mutual conversion between DC power and single-phase AC power and including: a control circuit CTR; an inverter cell 100; an upper arm; a lower arm; n+a first regenerative rectification circuits (regenerative rectification diodes 6UN and 6UA and first resistors 5UN and 5UA) (where n and a are positive integers); m+b second regenerative rectification circuits (regenerative rectification diodes 6XM and 6XB and second resistors 5XM and 5XB) (where m and b are positive integers); a flying capacitor CF; a positive DC terminal 209; a negative DC terminal 210; and an AC terminal 211.

In the embodiments to be described below, it is assumed that N, A, M, and B respectively satisfy N=1 to n, A=1 to a, M=1 to m, and B=1 to b (where n, a, m, and b are equal to or greater than 2), unless otherwise defined.

The first resistors 5UN and 5UA and the second resistors 5XM and 5XB may be inductance elements.

The control circuit CTR controls the operations of the inverter cell 100, the upper arm, and the lower arm based on, for example, a control signal from a host controller of the power conversion apparatus.

The upper arm of the power conversion apparatus according to the present embodiment includes a first upper arm circuit SA and a second upper arm circuit SN. The first upper arm circuit SA includes a switch circuits (voltage-clamptype switch circuits) 101A. The second upper arm circuit SN includes n switch circuits (voltage-clamp-type switch circuits) 101N.

The lower arm of the power conversion apparatus according to the present embodiment includes a first lower arm circuit SB and a second lower arm circuit SM. The first lower arm circuit SB includes b switch circuits (voltage-clamp-type switch circuits) 102B. The second lower arm circuit SM includes m switch circuits (voltage-clamp-type switch circuits) 102M.

It is to be noted that, in the power conversion apparatus of the present embodiment, a DC capacitor (unillustrated) is electrically connected between the positive DC terminal 209 and the negative DC terminal 210. The DC capacitor may be included in the power conversion apparatus, or may be connected to a circuit outside of the power conversion apparatus.

The inverter cell 100 includes a switching element (upper-side switching element) 1U, a switching element (lower-side switching element) 1X, a power storage 2, a positive-side cell terminal (high-potential-side end) 200, a negative-side cell terminal (low-potential-side end) 201, and a cell AC terminal (AC end) 202. It suffices that the positive-side cell terminal 200, the negative-side cell terminal 201, and the cell AC terminal 202 are configured in such a manner that circuits can be electrically connected at the positions of these terminals, and the terminals may be omitted.

The switching elements 1U and 1X are, for example, metal-oxide semiconductor field-effect transistors (MOSFETs). The switching element 1U is electrically connected, at a drain (high-potential-side end), to the positive-side cell terminal 200, and is electrically connected, at a source (low-potential-side end), to a drain (high-potential-side end) of the switching element 1X. A source (low-potential-side end) of the switching element 1X is electrically connected to the negative-side cell terminal 201. A line between the switching element 1U and the switching element 1X is electrically connected to the cell AC terminal 202.

The power storage 2 is, for example, a floating capacitor, and is connected in parallel with the switching elements 1U and 1X. One end of the floating capacitor 2 is electrically connected to the drain of the switching element 1U and the positive-side cell terminal 200, and the other end of the floating capacitor 2 is electrically connected to the source of the switching element 1X and the negative-side cell terminal 201. The power storage 2 is not limited to a capacitor, and may be, for example, a battery, or any other configuration capable of storing electric energy.

Each of the n switch circuits (first switch circuits) 101N includes a switching element (first switching element) 1UN, a positive-side terminal 203N, and a negative-side terminal 204N. At least one of the n first switch circuits 101N includes a diode (first diode) 4UN, a capacitor (first capacitor) 3UN, and a snubber terminal 205N. In the present embodiment, a case will be described where all of the n first switch circuits 101N each include a diode (first diode) 4UN, a capacitor (first capacitor) 3UN, and a snubber terminal 205N.

It suffices that the snubber terminal 205N, the positive-side terminal 203N, and the negative-side terminal 204N are configured to enable electrical connection of circuits at the positions of these terminals, and the terminals may be omitted.

The switch circuit 101N may include a plurality of switching elements 1UN. In this case, the switching elements 1UN are, between the positive-side terminal 203N and the negative-side terminal 204N, connected in parallel with the capacitor 3UN and the diode 4UN. The switching elements 1UN may be connected either in series or in parallel with each other.

The switching element 1UN is, for example, a MOSFET. A drain (high-potential-side end) of the switching element 1UN is electrically connected to the positive-side terminal 203N, and a source (low-potential-side end) of the switching element 1UN is electrically connected to the negative-side terminal 204N.

The diode 4UN is electrically connected, at a cathode, to a source of the switching element 1UN and the negative-side terminal 204N, and is electrically connected, at an anode, to the snubber terminal 205N. It is desirable that the diode 4UN have fast recovery characteristics with a low recovery loss, and be formed using, for example, a Schottky barrier diode (SBD) with good recovery characteristics or an element utilizing a wide bandgap semiconductor (e.g. SiC, GaN, etc.).

The capacitor (snubber capacitor) 3UN is electrically connected, at one end (high-potential-side end), to a drain of the switching element 1UN and the positive-side terminal 203N, and is electrically connected, at the other end (low-potential-side end), an anode of the diode 4UN and the snubber terminal 205N.

The n switch circuits 101N are connected in series. That is, a switch circuit 101N is electrically connected, at a positive-side terminal (high-potential-side end) 203N, to a negative-side terminal (low-potential-side end) 204N of a switch circuit 101N adjacent thereto on the high-potential side, and a switch circuit 101N on the highest-potential side is electrically connected, at a positive-side terminal 203N (N=n), to the positive DC terminal 209. A switch circuit 101N is electrically connected, at a negative-side terminal 204N, to a positive-side terminal 203N of a switch circuit 101N adjacent thereto on the low-potential side, and a switch circuit 101N on the lowest-potential side is electrically connected, at a negative-side terminal 204N (N=1), to a positive-side terminal 203A (A=a) of a switch circuit 101A on the highest-potential side.

Each of the a switch circuits (first switch circuits) 101A includes a switching element (first switching element) 1UA, a positive-side terminal 203A, and a negative-side terminal 204A. At least one of the a first switch circuits 101A includes a diode (first diode) 4UA, a capacitor (first capacitor) 3UA, and a snubber terminal 205A. In the present embodiment, a case will be described where each of the a first switch circuits 101A includes a diode (first diode) 4UA, a capacitor (first capacitor) 3UA, and a snubber terminal 205A.

It suffices that the snubber terminal 205A, the positive-side terminal 203A, and the negative-side terminal 204A are configured to enable electrical connection of circuits at the positions of these terminals, and the terminals may be omitted.

The switch circuit 101A may include a plurality of switching elements 1UA. In this case, the switching elements 1UA are, between the positive-side terminal 203A and the negative-side terminal 204A, connected in parallel with the capacitor 3UA and the diode 4UA. The switching elements 1UA may be connected either in series or in parallel with each other.

The switching element 1UA is, for example, a MOSFET. A drain (high-potential-side end) of the switching element 1UA is electrically connected to the positive-side terminal 203A, and a source (low-potential-side end) of the switching element 1UA is electrically connected to the negative-side terminal 204A.

The diode 4UA is electrically connected, at a cathode, to a source of the switching element 1UA and the negative-side terminal 204A, and is electrically connected, at an anode, to the snubber terminal 205A. It is desirable that the diode 4UA have fast recovery characteristics with a low recovery loss, and be formed using, for example, a Schottky barrier diode (SBD) with good recovery characteristics or an element utilizing a wide bandgap semiconductor (e.g. SiC, GaN, etc.).

The capacitor 3UA is electrically connected, at one end (high-potential-side end), to a drain of the switching element 1UA and the positive-side terminal 203A, and is electrically connected, at the other end (low-potential-side end), to an anode of the diode 4UA and to the snubber terminal 205A.

The a switch circuits 101A are connected in series. That is, a switch circuit 101A is electrically connected, at a positive-side terminal (high-potential-side end) 203A, to a negative-side terminal (low-potential-side end) 204A of a switch circuit 101A adjacent thereto on the high-potential side, and a switch circuit 101A on the highest-potential side is electrically connected, at a positive-side terminal 203A (N=a), to a negative-side terminal 204N (N=1) of a switch circuit 101N on the lowest-potential side. A switch circuit 101A is electrically connected, at a negative-side terminal 204A, to a positive-side terminal 203A of a switch circuit 101A adjacent thereto on the low-potential side, and a switch circuit 101A (A=1) on the lowest-potential side is electrically connected, at a negative-side terminal 204A, to the positive-side cell terminal 200 of the inverter cell 100.

If at least one of the first switch circuits 101A includes a first capacitor 3UA connected in parallel with the first switching element 1UA, the first regenerative rectification circuit causes the first capacitors 3UA to be connected in parallel via one or more first switching elements 1UA or at least one of the first capacitors 3UA and the power storage 2 to be connected in parallel via one or more first switching elements 1UA.

If at least one of the first switch circuits 101N includes a first capacitor 3UN connected in parallel with the first switching element 1UN, the first regenerative rectification circuit causes the first capacitors 3UN to be connected in parallel via one or more first switching elements 1UA or at least one of the first capacitors 3UN and the power storage 2 (or the first capacitor 3UA) to be connected in parallel via one or more first switching elements 1UN.

The a regenerative rectification diodes 6UA (A=1 to a) are connected in series to each other, and each of the a regenerative recitification diodes 6UA (A=1 to a) is placed between a low-potential-side end of the switching element 1X (a low-potential-side end of the inverter cell 100) and a low-potential-side end of the capacitor 3U1 of the first switch circuit 101A (A=1) arranged on the lowest-potential side or between low-potential-side ends of capacitors 3UA of neighboring first switch circuits 101A, with a direction from the low-potential side toward the high-potential side being a forward direction.

The n regenerative rectification diodes 6UN (N=1 to n) are connected in series to each other, and each of the n regenerative recitification diodes 6UN (N=1 to n) is placed between a low-potential-side end of the capacitor 3Ua of a first switch circuit 101A (A=a) on the highest-potential side and a low-potential-side end of a capacitor 3U1 of a first switch circuit 101N (N=1) on the lowest-potential side or between low-potential-side ends of capacitors 3UN of neighboring first switch circuits 101N, with a direction from the low-potential side toward the high-potential side being a forward direction.

Cathodes of the regenerative rectification diodes (first regenerative rectification diodes) 6UA (A=1 to a) are respectively electrically connected to snubber terminals 205A (A=1 to a) of the switch circuit 101A and anodes of neighboring regenerative rectification diodes 6UA (A=1 to a) on the high-potential side. Cathodes of the regenerative rectification diodes (first regenerative rectification diodes) 6UN (N=1 to n) are respectively electrically connected to snubber terminals 205N (N=1 to n) of the switch circuit 101N and anodes of neighboring regenerative rectification diodes 6UN (N=1 to n) on the high-potential side. For example, a regenerative rectification diode 6Uk ($1 \le k \le n-1$) is electrically connected, at a cathode, to a snubber terminal 205$k$ of a switch circuit 101$k$ and an anode of a regenerative rectification diode 6U(k+1).

The resistor 5UA is, at one end, connected in series to a parallel circuit of the diode 4UA and the capacitor 3UA. The other end of the resistor 5UA is electrically connected, via the regenerative rectification diode 6UA, to the circuit in which the capacitor 3UA of the switch circuit 101A connected on the low-potential side and the resistor 5UA are connected in series. The other end of the resistor 5UA of the switch circuit 101A (A=1) arranged on the lowest-potential side is electrically connected to the negative-side cell terminal 201 of the inverter cell 100 via the regenerative rectification diode 6UA.

The resistor 5UN is, at one end, connected in series to a parallel circuit of the diode 4UN and the capacitor 3UN. The other end of the resistor 5UN is electrically connected, via the regenerative rectification diode 6UN, to a circuit in which the capacitor 3UN of the switch circuit 101N connected on the low-potential side and the resistor 5UN are connected in series. The other end of the resistor 5UN of the switch circuit 101N (N=1) arranged on the lowest-potential side is electrically connected to the negative-side cell terminal 201 of the inverter cell 100 via the regenerative rectification diode 6UA (A=1 to a).

Each of the m switch circuits (second switch circuits) 102M includes a switching element (second switching element) 1XM, a positive-side terminal 206M, and a negative-side terminal 207M. At least one of the m switch circuits (second switch circuits) 102M includes a diode (second diode) 4XM, a capacitor (second capacitor) 3XM, and a snubber terminal 208M. In the present embodiment, a case will be described where all of the m switch circuits (second switch circuits) 102M each include a diode (second diode) 4XM, a capacitor (second capacitor) 3XM, and a snubber terminal 208M.

It suffices that the positive-side terminal 206M, the negative-side terminal 207M, and the snubber terminal 208M are configured to enable electrical connection of circuits at the positions of these terminals, and the terminals may be omitted. The switch circuit 102M may include a plurality of switching elements 1XM. In this case, the switching elements 1XM are, between the positive-side terminal 206M and the negative-side terminal 207M, connected in parallel with the capacitor 3XM and the diode 4XM. The switching elements 1XM may be connected either in series or in parallel with each other.

The switching element 1XM is, for example, a MOSFET. The switching element 1XM is electrically connected, at a drain (high-potential-side end), to the positive-side terminal 206M, and electrically connected, at a source (low-potential-side end), to the negative-side terminal 207M.

The diode 4XM is electrically connected, at an anode, to a drain of the switching element 1XM and the positive-side terminal 206M, and electrically connected, at a cathode, to the snubber terminal 208M. It is desirable that the diode 4XM have fast recovery characteristics with a low recovery loss, and be formed using, for example, a Schottky barrier diode (SBD) with good recovery characteristics or an element utilizing a wide bandgap semiconductor (e.g. SiC, GaN, etc.).

The capacitor (snubber capacitor) 3XM is electrically connected, at one end (low-potential-side end), to a source of the switching element 1XM and the negative-side terminal 207M, and is electrically connected, at the other end (high-potential-side end), to a cathode of the diode 4XM and to the snubber terminal 208M.

The m switch circuits 102M are connected in series. That is, a switch circuit 102M is electrically connected, at a positive-side terminal 206M, to a negative-side terminal 207M of a switch circuit 102M adjacent thereto on the high-potential side, and a switch circuit 102M on the highest-potential side is electrically connected, at a positive-side terminal 206M (M=1), to a negative-side terminal 207B (B=b) of a switch circuit 102B on the lowest-potential side. The switch circuit 102M is electrically connected, at a negative-side terminal 207M, to a positive-side terminal 206M of a switch circuit 102M adjacent thereto on the low-potential side, and a switch circuit 102M on the lowest-potential side is electrically connected, at a negative-side terminal 207M (M=m), to the negative DC terminal 210.

Each of the b switch circuits (second switch circuits) 102B includes a switching element (second switching element) 1XB, a positive-side terminal 206B, and a negative-side terminal 207B. At least one of the b switch circuits (second switch circuits) 102B includes a diode (second diode) 4XB, a capacitor (second capacitor) 3XB, and a snubber terminal 208B. In the present embodiment, a case will be described where all of the b switch circuits (second switch circuits) 102B each include a diode (second diode) 4XB, a capacitor (second capacitor) 3XB, and a snubber terminal 208B.

It suffices that the positive-side terminal 206B, the negative-side terminal 207B, and the snubber terminal 208B are configured to enable electrical connection of circuits at the positions of these terminals, and the terminals may be omitted. The switch circuit 102B may include a plurality of switching elements 1XB. In this case, the switching elements 1XB are, between the positive-side terminal 206B and the negative-side terminal 207B, connected in parallel with the capacitor 3XB and the diode 4XB. The switching elements 1XB may be connected either in series or in parallel with each other.

The switching element 1XB is, for example, a MOSFET. The switching element 1XB is electrically connected, at a drain (high-potential-side end), to the positive-side terminal 206B, and electrically connected, at a source (low-potential-side end), to the negative-side terminal 207B.

The diode 4XB is electrically connected, at an anode, to a drain of the switching element 1XB and the positive-side terminal 206B, and electrically connected, at a cathode, to the snubber terminal 208B. It is desirable that the diode 4XB have fast recovery characteristics with a low recovery loss, and be formed using, for example, a Schottky barrier diode (SBD) with good recovery characteristics or an element utilizing a wide bandgap semiconductor (e.g. SiC, GaN, etc.).

The capacitor 3XB is electrically connected, at one end (low-potential-side end), to a source of the switching element 1XB and the negative-side terminal 207B, and is electrically connected, at the other end (high-potential-side end), to a cathode of the diode 4XB and to the snubber terminal 208B.

The b switch circuits 102B are connected in series. That is, the switch circuit 102B is electrically connected, at a positive-side terminal 206B, to a negative-side terminal 207B of a switch circuit 102B adjacent thereto on the high-potential side, and the positive-side terminal 206B (B=1) of the switch circuit 102B of the highest-potential side is electrically connected to the negative-side cell terminal 201 of the inverter cell 100. The switch circuit 102B is electrically connected, at a negative-side terminal 207B, to a positive-side terminal 206B of a switch circuit 102B adjacent thereto on the low-potential side, and a switch circuit 102B on the lowest-potential side is electrically connected, at a negative-side terminal 207B (B=b), to a positive-side terminal 206M (M=1) of a switch circuit 102M on the highest-potential side.

If at least one of the second switch circuits 102B includes a second capacitor 3XB connected in parallel with the second switching element 1XB, the second regenerative rectification circuit causes the second capacitors 3XB to be connected in parallel via one or more second switching elements 1XB or at least one of the second capacitors 3XB and the power storage 2 to be connected in parallel via one or more second switching elements 1XB.

Also, if at least one of the second switch circuits 102M includes a second capacitor 3XM connected in parallel with the second switching element 1XM, the second regenerative rectification circuit causes the second capacitors 3XM to be connected in parallel via one or more second switching elements 1XM or at least one of the second capacitors 3XM and the power storage 2 (or the second capacitor 3Xb) to be connected in parallel via one or more second switching elements 1XM.

The b regenerative rectification diodes (second regenerative rectification diodes) 6XB (B=1 to b) are connected in series to each other, and each of the b regenerative recitification diodes 6XB (B=1 to b) is placed between high-potential-side ends of capacitors 3XB of neighboring second switch circuits 102B, and between a high-potential side terminal of the switching element 1U (a high-potential-side end of the inverter cell 100) and a high-potential-side end of a capacitor 3XB of a second switch circuit 102B (B=1) arranged on the highest-potential side, with a direction from the low-potential side toward the high-potential side being a forward direction.

The m regenerative rectification diodes (second regenerative rectification diodes) 6XM (M=1 to m) are connected in series to each other, and each of the m regenerative recitification diodes 6XM (M=1 to m) is placed between high-potential-side ends of capacitors 3XM of neighboring second switch circuits 102M, and between a high-potential-side end of a capacitor 3XM of a second switch circuit 102M (m=1) arranged on the highest-potential side and a high-potential-side end of a capacitor 3XB of a second switch circuit 102B (B=b) arranged on the lowest-potential side, with a direction from the low-potential side toward the high-potential side being a forward direction.

Anodes of the regenerative rectification diodes 6XB (B=1 to b) are respectively electrically connected to snubber terminals 208B (B=1 to b) of the switch circuit 102B and cathodes of neighboring regenerative rectification diodes 6XB (B=1 to b) on the low-potential side. Anodes of the regenerative rectification diodes 6XM (M=1 to m) are respectively electrically connected to cathodes of snubber terminals 208M (M=1 to m) of the switch circuit 102M and cathodes of neighboring regenerative rectification diodes 6XM (M=1 to m) on the low-potential side. For example, a regenerative rectification diode 6Xj (1≤j≤m−1) is electrically connected, at an anode, to a snubber terminal 208j of a switch circuit 102j and a cathode of a regenerative rectification diode 6X(j+1).

The resistor 5XM is, at one end, connected in series to a parallel circuit of the diode 4XM and the capacitor 3XM. The other end of the resistor 5XM is electrically connected, via the regenerative rectification diode 6XM, to the circuit in which the capacitor 3XM of the switch circuit 102M connected on the high-potential side and the resistor 5XM are connected in series. The other end of the resistor 5XM of the switch circuit 102M (M=1) arranged on the highest-potential side is electrically connected, via the regenerative rectification diode 6Xb, to the circuit in which the capacitor 3Xb of the switch circuit 102b and the resistor 5Xb are connected in series.

The resistor 5XB is, at one end, connected in series to a parallel circuit of the diode 4XB and the capacitor 3XB. The other end of the resistor 5XB is electrically connected, via the regenerative rectification diode 6XB, to the circuit in which the capacitor 3XB of the switch circuit 102B connected on the high-potential side and the resistor 5XB are connected in series. The other end of the resistor 5XB of the switch circuit 102B (B=1) arranged on the highest-potential side is electrically connected to the positive-side cell terminal 200 of the inverter cell 100 via the regenerative rectification diode 6XB.

It suffices that at least one of the first switch circuit 101N and the first switch circuit 101A includes first diodes 4UN and 4UA connected, at cathodes, to low-potential-side ends of the first switching elements 1UN and 1UA, and first capacitors 3UN and 3UA connected between anodes of the first diodes 4UN and 4UA and high-potential-side ends of the first switching elements 1UN and 1UA. That is, the power conversion apparatus according to the present embodiment comprises a regenerative rectification circuit configured, if at least one of first switch circuits 101N and 101A includes first diodes 4UN and 4UA connected, at cathodes, to low-potential-side ends of first switching elements 1UN and 1UA, and first capacitors 3UN and 3UA connected between anodes of the first diodes 4UN and 4UA and high-potential-side ends of the first switching elements 1UN and 1UA, to connect a low-potential-side end of the inverter cell 100 and low-potential-side ends of the first capacitors 3UN and 3UA of the upper arm, with a direction from the low-potential side toward the high-potential side being a forward direction.

Similarly, it suffices that at least one of the second switch circuit 102M and the second switch circuit 102B includes second diodes 4XM and 4XB connected, at anodes, to high-potential-side ends of second switching elements 1XM and 1XB, and second capacitors 3XM and 3XB connected between cathodes of second diodes 4XM and 4XB and low-potential-side ends of second switching elements 1XM and 1XB. That is, the power conversion apparatus according to the present embodiment comprises a regenerative rectification circuit configured, if at least one of second switch circuits 102M and 102B includes second diodes 4XM and 4XB connected, at anodes, to high-potential-side ends of second switching elements 1XM and 1XB, and second capacitors 3XM and 3XB connected between cathodes of the second diodes 4XM and 4XB and low-potential-side ends of the second switching elements 1XM and 1XB, to connect a high-potential-side end of the inverter cell 100 and high-potential-side ends of the second capacitors 3XM and 3XB of the lower arm, with a direction from the low-potential side toward the high-potential side being a forward direction.

It is to be noted that, in the power conversion apparatus of the present embodiment, it is desirable that the number n of the switch circuits 101N and the number m of the switch circuits 102M be equal; however, the numbers n and m may be different. It is desirable that the number a of the switch circuits 101A and the number b of the switch circuits 102B be equal; however, the numbers a and b may be different.

In the power conversion apparatus of the present embodiment, the switching elements 1U, 1X, 1UN, 1UA, 1XM, and 1UB are not limited to MOSFETs, and may be, for example, Insulated Gate Bipolar transistors (IGBTs), mechanical switches, or the like.

Moreover, although advantageous effects of the present embodiment can be obtained even by using elements with various voltage ratings or current ratings as the switching elements 1U, 1X, 1UN, 1UA, 1XM, and 1UB, it is desirable to use elements with the same voltage rating and current rating as the switching elements 1U, 1X, 1UN, 1UA, 1XM, and 1UB.

The flying capacitor CF is, at a high-potential-side end, electrically connected to an upper arm between a negative-side terminal 204N of a first switch circuit 101N (N=1) on the lowest-potential side and a positive-side terminal 203A of a first switch circuit 101A (A=a) on the highest-potential side. The flying capacitor CF is, at a low-potential-side end, electrically connected to a lower arm between a positive-side terminal 206M of a second switch circuit 102M (M=1) on the highest-potential side and a negative-side terminal 207B of a second switch circuit 102B (B=b) on the lowest-potential side.

It is desirable that a capacitor 3Ua of a switch circuit 101a, which is located between the positive DC terminal 209 and the AC terminal 211, and to which the flying capacitor CF and a drain (or collector) of a switching element is connected, and a capacitor 3Xb of a switch circuit 102b which is located between the negative DC terminal 210 and the AC terminal 211 and to which the flying capacitor CF and a source (or an emitter) of a switching element is connected, have electrostatic capacitances larger than those of the other capacitors 3UN, 3UA, 3XB, and 3XM, in order to temporarily buffer the absorbed energy.

Next, an example of the operation of the power conversion apparatus of the present embodiment will be described.

The power conversion apparatus according to the present embodiment is configured to store various voltages in the flying capacitor CF, and to allow for multi-level outputs through addition and subtraction of voltage values.

It is to be noted that the power conversion apparatus according to the present embodiment is controlled in such a manner that the voltage of the flying capacitor CF is smaller than a sum of voltages of the capacitors 3UN and 3UA of the upper arm, and smaller than a sum of voltages of the capacitors 3XB and 3XM of the lower arm. The voltage of the flying capacitor CF is determined in advance by a direct-current voltage of the power conversion apparatus and a divided voltage applied to the flying capacitor CF. Accordingly, by, for example, adjusting the specification value of the direct-current voltage of the power conversion apparatus or adjusting the voltage command value used for controlling the output power of the power conversion apparatus, the voltage of the flying capacitor CF is controlled so as to be smaller than a sum of voltages of the capacitors 3UN and 3UA of the upper arm, and smaller than a sum of voltages of the capacitors 3XB and 3XM of the lower arm.

It is to be noted that the voltage of the flying capacitor CF may be controlled so as to be, for example, smaller than the value obtained by multiplying the minimum value of the voltages of the capacitors 3UN and 3UA by the number (=n+a) of the first switch circuits connected in series, and smaller than the value obtained by multiplying the minimum value of the voltages of the capacitors 3XB and 3XM by the number (=m+b) of the second switch circuits connected in series.

If, for example, the voltage of the flying capacitor CF is greater than the sum of the voltages of the capacitors 3UN and 3UA, an unintended current may flow from the flying capacitor CF to the regenerative rectification circuit, in which case the power conversion efficiency of the power conversion apparatus decreases and desired electric power cannot be output. If, for example, the voltage of the flying capacitor CF is decreased, a voltage obtained by subtracting the voltage of the flying capacitor CF from the direct-current voltage becomes greater than a sum of voltages of snubber capacitors corresponding to the outer capacitors 3UN and 3UA (on the side closer to the DC terminal), increasing the risk of a rush current flowing to the outer snubber capacitors. However, since the outer snubber capacitor 3UN is arranged at a position distanced from the floating capacitor 2, and tends to increase in voltage compared to the inner snubber capacitor 3UA (on the side farther from the DC terminal), it is desirable to take into account the voltage of the inner snubber capacitor 3UA. By thus making the voltage of the flying capacitor CF smaller than the sum of the voltages of the capacitors 3UN and 3UA of the upper arm and smaller than the sum of the voltages of the capacitors 3XB and 3XM of the lower arm, it is possible to avoid a decrease in power conversion efficiency of the power conversion apparatus.

Figure 2:
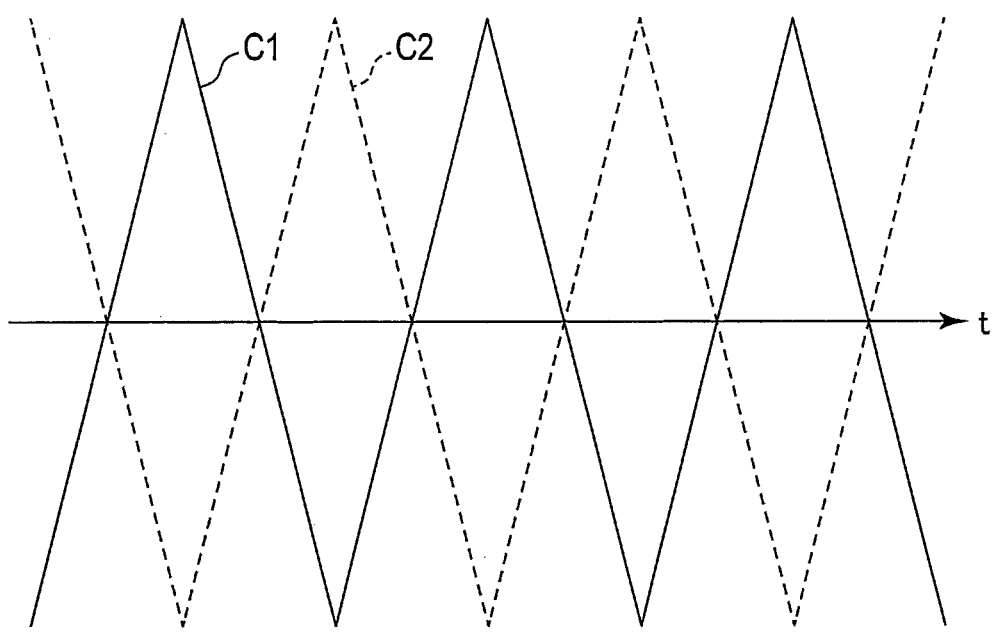
FIG. 2 is a diagram illustrating an example of an operation of the power conversion apparatus according to the first embodiment.

FIG. 2 is a diagram illustrating an example of an operation of the power conversion apparatus according to the first embodiment.

In the present embodiment, the control circuit CTR generates control signals of the second upper arm circuit SN, the first upper arm circuit SA, the first lower arm circuit SB, the second lower arm circuit SX, and the switching elements 1U and 1X by a carrier phase-shift modulation scheme using carrier waves C1 and C2 with phases that are shifted from each other by approximately 180 degrees.

The control signals of the first upper arm circuit SA and the first lower arm circuit SB are generated by, for example, comparing the carrier wave C1 and a command value. The control signals of the second upper arm circuit SN and the second lower arm circuit SM are generated by, for example, comparing the carrier wave C2 and a command value.

If all the switching elements 1UN of the second upper arm circuit SN and all the switching elements 1UA of the first upper arm circuit SA are turned on and all the switching elements 1XB of the first lower arm circuit SB and all the switching elements 1XM of the second lower arm circuit SM are turned off (first switch mode), the voltage of the AC terminal 211 becomes equal to the direct-current voltage (voltage of a line between the positive DC terminal 209 and the negative DC terminal 210).

If all the switching elements 1XB of the first lower arm circuit SB and all the switching elements 1XM of the second lower arm circuit SM are turned on, and all the switching elements 1UN of the second upper arm circuit SN and all the switching elements 1UA of the first upper arm circuit SA are turned off (second switch mode), the voltage of the AC terminal 211 becomes equal to a negative direct-current voltage.

If all the switching elements 1UN of the second upper arm circuit SN and all the switching elements 1XB of the first lower arm circuit SB are turned on, and all the switching elements 1UA of the first upper arm circuit SA and all the switching elements 1XM of the second lower arm circuit SM are turned off (third switch mode), a voltage obtained by subtracting the voltage of the flying capacitor CF from the direct-current voltage is applied to the AC terminal 211.

If all the switching elements 1UA of the first upper arm circuit SA and all the switching elements 1XM of the fourth switch circuit SM are turned on and all the switching elements 1UN of the second upper arm circuit SN and all the switching elements 1XB of the first lower arm circuit SB are turned off (fourth switch mode), the voltage of the flying capacitor CF is applied to the AC terminal 211.

Next, an example of an operation of accumulating energy generated at the time of switching into the floating capacitor 2 in the power conversion apparatus according to the present embodiment will be described.

In the power conversion apparatus according to the present embodiment, the control circuit CTR controls the switching elements 1UN, 1UA, 1UB, and 1XM of each of the upper arm circuits SN and SA and the lower arm circuits SB and SM to be sequentially switched at predetermined time intervals, thereby reducing losses such as a turn-on loss, a turn-off loss, and a recovery loss.

An example of an operation in which, for example, the power conversion apparatus is brought to a first switch mode will be described.

If a current is being output from the AC terminal 211 in the state in which all of the switching elements 1U and 1X of the inverter cell 100, the switching elements 1UN and 1UA of the upper arm, and the switching elements 1UB and 1XM of the lower arm are turned off, a current flows through a parasitic diode of the switching element 1X of the inverter cell 100 and parasitic diodes of the switching elements 1XM and 1XB of the switch circuits 102M and 102B.

If the switching element 1U of the inverter cell 100 is turned on in this state, a current flows through parasitic diodes of the switching elements 1XM of the switch circuits 102B and 102M of the lower arm, flows through the inverter cell 100 in such a direction as to discharge the floating capacitor 2, flows through the switching element 1U, and flows to the AC terminal 211.

Subsequently, any one of the switching elements 1UN of the switch circuits 101N of the upper arm is turned on, and any one of the switching elements 1UA of the switch circuit 101A is turned on. Herein, a case will be described where the switching element 1Un of the switch circuit 101n and the switching element 1Ua of the switch circuit 101a are turned on.

If the switching element 1Un is turned on, the voltage applied to one of the switch circuits 101N is divided among the number (=m) of the switch circuits 102M connected in series, and the divided voltages are applied to the respective switch circuits 102M. This causes a decrease in the voltage applied at the time of recovery of the parasitic diodes of the switching elements 1XM of the switch circuits 102M, and causes a decrease in loss (recovery loss) that occurs at the time of recovery. In addition, due to a parasitic inductance of a switching loop that increases according to the number of switch circuits 102M connected in series, the amount of change of the recovery current decreases, resulting in a decrease in recovery charge and a decrease in recovery loss.

Similarly, if the switching element 1Ua is turned on, the voltage applied to one of the switch circuits 101A is divided among the number (=b) of the switch circuits 102B connected in series, and the divided voltages are applied to the respective switch circuits 102B. This causes a decrease in the voltage applied at the time of recovery of the parasitic diodes of the switching elements 1XB of the switch circuits 102B, and causes a decrease in loss (recovery loss) that occurs at the time of recovery. In addition, due to a parasitic inductance of a switching loop that increases according to the number of switch circuits 102B connected in series, the amount of change of the recovery current decreases, resulting in a decrease in recovery charge and a decrease in recovery loss.

If a voltage is applied to the switch circuits 102M and 102B, a current cannot flow through the parasitic diodes of the switching elements 1XM and 1XB, and is commutated to the switch circuits 101N and 101A. Accordingly, a current flows through the switching elements 1Un and 1Ua that are turned on in the switch circuits 101n and 101a, and a current flows through the capacitors 3UN (N=1 to (n-1)) and 3UA (A=1 to (a-1)) and the diodes 4UN(N=1 to (n-1)) and 4UA (A=1 to (a-1)) in other switch circuits 101N (N=1 to (n-1)) and other switch circuits 101A (A=1 to (a-1)).

With the transition of the state of flowing of the current, the energy that is converted into heat as a switching loss in a conventional 2-level inverter, for example, is stored in the capacitors 3UN(N=1 to (n-1)) and 3UA(A=1 to (a-1)) in the power conversion apparatus according to the present embodiment. That is, the switching loss in the power conversion apparatus of the present embodiment is merely a loss incurred by the switching of the switching elements 1UN and 1UA of the switch circuits 101N and 101A, and is much smaller than that in the conventional 2-level inverter.

Also, by turning on the switching element 1Un, for example, the diode 4Un and the capacitor 3Un of the switch circuit 101n are connected in parallel. The resistor 5Un is, at one end, connected in series to a parallel circuit of the diode 4Un and the capacitor 3Un. The resistor 5Un is, at the other end, electrically connected, via the regenerative rectification diode 6Un, to a circuit in which the capacitor 3U(n-1) of the switch circuit 101(n-1) and the resistor 5U(n-1) are connected in series. This allows the capacitor 3Un and the capacitor 3U(n-1) to be connected in parallel, and the energy stored in the capacitor 3Un is discharged to the capacitor 3U(n-1). The discharging is completed by the voltage of the capacitor 3Un becoming equal to the voltage of the capacitor 3U(n-1).

It is to be noted that, in the example described above, if the voltage of the capacitor 3Un is higher than the voltage of the capacitor 3U(n-1), the capacitor 3Un is discharged. In addition, since a difference between the voltage of the capacitor 3Un and the voltage of the capacitor 3U (n-1) is sufficiently smaller than the voltage of each of the capacitors 3Un and 3U(n-1), the discharging can be performed with a high efficiency even if the resistors 5Un and 5U(n-1) intervene in the path of the energy that is discharged.

If the switching elements 1UN of the switch circuits 101N are sequentially turned on and all the switching elements 1UN are turned on, the energy stored in the capacitors 3UN is sequentially discharged, and the discharged energy is stored in the capacitor 3Ua. It is to be noted that the energy discharged from the capacitor 3UN is temporarily stored in the capacitor 3Ua, and is ultimately discharged to the AC terminal 211 via the floating capacitor 2.

Also, if the switching elements 1UA of the switch circuits 101A are sequentially turned on and all the switching elements 1UA are turned on, the energy stored in the capacitor 3UA is sequentially discharged, and if all the switching elements 1UA are turned on, the discharged energy is stored in the floating capacitor 2.

In this state, the power conversion apparatus is set to a first switch mode in which the switching elements of the upper arm are turned on.

Thereafter, if the switching elements 1UN and 1UA are sequentially turned off and all the switching elements 1UN and 1UA are turned off, the floating capacitor 2 is discharged, and the energy generated by the switching can be efficiently regenerated. Thereafter, the switching elements 1U are turned off, and the upper arm of the power conversion apparatus is turned off.

Similarly, in the case of switching the switching elements of the lower arm of the power conversion apparatus, the energy generated by the switching can be stored in the floating capacitor 2 via the capacitors 3XM and 3XB, and the energy generated by the switching can be efficiently regenerated by discharging the floating capacitor 2.

As described above, with the power conversion apparatus of the present embodiment, it is possible to, for example, store much of the energy at the time of switching, which is a loss in the conventional inverter, in the floating capacitor 2 via the capacitors 3UN, 3UA, 3XM, and 3XB, and to reduce the switching loss by discharging the floating capacitor 2 without increasing the switching speed. In addition, by applying a low voltage to the switching elements 1UN, 1UA, 1XM, and 1XB at the time of recovery of the parasitic diodes of the switching elements 1UN, 1UA, 1XM, and 1XB, it is possible to reduce a recovery loss. That is, the power conversion apparatus according to the present embodiment is capable of improving a tradeoff between the switching loss and the capacity of the flying capacitor CF.

It is to be noted that, since all the switching elements are switched in a cycle of a carrier wave in the power conversion apparatus according to the present embodiment, the capacitors 3UN, 3UA, 3XM, and 3XB are capable of accumulating energy in the floating capacitor 2 without storing the absorbed energy over multiple cycles. That is, in the present embodiment, there is no switching mode in which the capacitors 3UN, 3UA, 3XM, and 3XB increase in size, thus preventing the power conversion apparatus from increasing in size.

As described above, according to the present embodiment, it is possible to provide a power conversion apparatus capable of suppressing the energy loss to a low level and avoiding an increase in size.

It is to be noted that the upper arm of the inverter cell 100 may be a voltage-clamp-type switch circuit with a configuration similar to that of the switch circuit 101N, and the lower arm of the inverter cell 100 may be a voltage-clamp-type switch circuit with a configuration similar to that of the switch circuit 102M. In this case, the regenerative rectification circuit further includes a circuit connected between the low-potential-side end of the inverter cell 100 and the low-potential-side end of the snubber capacitor of the upper arm, and a circuit connected between the high-potential-side end of the inverter cell 100 and the high-potential-side end of the snubber capacitor of the lower arm, with a direction from the low-potential side toward the high-potential side being a forward direction. For the upper arm and the lower arm of the inverter cell 100, common circuits may be used as switch circuits similar to the switch circuits 101N and 102M.

Next, a power conversion apparatus according to a second embodiment will be described in detail with reference to the drawings.

In the embodiments to be described below, structural parts similar to those in the above-described first embodiment will be denoted by the same reference signs, and a description thereof will be omitted.

FIG. 3 is a diagram schematically showing a configuration example of the power conversion apparatus according to the second embodiment.

The power conversion apparatus according to the present embodiment is, for example, a three-level flying-capacitor-type power conversion apparatus capable of performing mutual conversion between DC power and single-phase AC power and including: a control circuit CTR; an inverter cell 100; an upper arm; a lower arm; n+a first regenerative rectification circuits (regenerative rectification diodes 6UN and 6UA and first resistors 5UN and 5UA) (where n and a are positive integers); m+b second regenerative rectification circuits (regenerative rectification diodes 6XM and 6XB and second resistors 5XM and 5XB) (where m and b are positive integers); a flying capacitor CF; a positive DC terminal 209; a negative DC terminal 210; and an AC terminal 211.

Here, N, A, M, and B respectively satisfy N=1 to n, A=1 to a, M=1 to m, B=1 to b (where n, a, m, and b are equal to or greater than 2), unless otherwise defined. The first resistors 5UN and 5UA and the second resistors 5XM and 5XB may be inductance elements.

The power conversion apparatus of the present embodiment differs from the power conversion apparatus of the above-described first embodiment in terms of the configurations of first regenerative rectification circuits and second regenerative rectification circuits.

The first regenerative rectification circuits include a plurality of first circuits and a plurality of second circuits. Each of the first circuits includes a regenerative rectification diode 6UA and a resistor 5UA. Each of the second circuits includes a regenerative rectification diode 6UN and a resistor 5UN.

The regenerative rectification diode 6UA is connected between a negative-side cell terminal 201 and a snubber terminal 205A, with a direction from the negative-side cell terminal 201 of the inverter cell 100 to the snubber terminal 205A of the switch circuit 101A being a forward direction. The resistor 5UA is connected in series to the regenerative rectification diode 6UA in a path that electrically connects a cathode of the regenerative rectification diode 6UA and the snubber terminal 205A. That is, anodes of the regenerative rectification diodes 6UA are electrically connected to the negative-side cell terminal 201 of the inverter cell 100 without intervention of another regenerative rectification diode 6UA.

In other words, in the present embodiment, the first circuits are connected between a low-potential-side terminal of the lower-side switching element (a low-potential-side end of the inverter cell 100) and low-potential-side ends of first capacitors of the first switch circuits, with a direction from the low-potential side toward the high-potential side being a forward direction.

The regenerative rectification diode 6UN is connected between the snubber terminal 205a and the snubber terminal 205N, with a direction from the snubber terminal 205a to the snubber terminal 205N of the switch circuit 101N being a forward direction. The resistor 5UN is connected in series with the regenerative rectification diode 6UN in a path that electrically connects a cathode of the regenerative rectification diode 6UN and the snubber terminal 205N. That is, anodes of the regenerative rectification diodes 6UN are electrically connected to the snubber terminal 205a without intervention of another regenerative rectification diode 6UN.

In other words, in the present embodiment, the second circuits are connected between a low-potential-side end of a capacitor 3Ua of a switch circuit 101a arranged on a highest-potential side of a neighboring first upper arm circuit SA on the low potential side and low-potential-side ends of the first capacitors of the first switch circuits, with a direction from the low-potential side toward the high-potential side being a forward direction.

The second regenerative rectification circuits include a plurality of third circuits and a plurality of fourth circuits. Each of the third circuits includes a regenerative rectification diode 6XB and a resistor 5XB. Each of the fourth circuits includes a regenerative rectification diode 6XM and a resistor 5XM.

The regenerative rectification diode 6XB is connected between the snubber terminal 208B and the positive-side cell terminal 200, with a direction from the snubber terminal 208B of the switch circuit 102B to the positive-side cell terminal 200 of the inverter cell 100 being a forward direction. The resistor 5XB is connected in series with the regenerative rectification diode 6XB in a path that electrically connects an anode of the regenerative rectification diode 6XB and the snubber terminal 208B. That is, cathodes of the regenerative rectification diodes 6XB are electrically connected to the positive-side cell terminal 200 of the inverter cell 100 without intervention of another regenerative rectification diode 6XB.

In other words, in the present embodiment, the third circuits are connected between the high-potential-side terminal of the upper-side switching element (high-potential-side end of the inverter cell 100) and the high-potential-side ends of the second capacitors of the second switch circuits, with a direction from the low-potential side toward the high-potential side being a forward direction.

The regenerative rectification diode 6XM is connected between the snubber terminal 208B and the snubber terminal 208b, with a direction from the snubber terminal 208M of the switch circuit 102M to the positive-side cell terminal 200 of the inverter cell 100 being a forward direction. The resistor 5XM is connected in series with the regenerative rectification diode 6XM in a path that electrically connects an anode of the regenerative rectification diode 6XM and the snubber terminal 208M. That is, cathodes of the regenerative rectification diodes 6XM are electrically connected to the snubber terminal 208b (high-potential-side end of the capacitor 3Xb) without intervention of another regenerative rectification diode 6XM.

In other words, in the present embodiment, the fourth circuits are connected between a high-potential-side end of a capacitor 3Xb of a switch circuit 102b arranged on a lowest-potential side of a neighboring first lower arm circuit SB on the high potential side and high-potential-side ends of the second capacitors of the second switch circuits, with a direction from the low-potential side toward the high-potential side being a forward direction.

As described above, the power conversion apparatus according to the present embodiment comprises a regenerative rectification circuit configured, if at least one first switch circuit 101N includes a first diode 4UN connected, at a cathode, to a low-potential-side end of a first switching element 1UN, and a first capacitor 3UN connected between an anode of the first diode 4UN and a high-potential-side end of the first switching element 1UN, to connect a low-potential-side end of the inverter cell 100 and a low-potential-side end of the first capacitor 3UN of the upper arm, with a direction from the low-potential side toward the high-potential side being a forward direction.

In addition, the power conversion apparatus according to the present embodiment comprises a regenerative rectification circuit configured, if at least one second switch circuit 102X includes a second diode 4XM connected, at an anode, to a high-potential-side end of a second switching element 1XM, and a second capacitor 3XM connected between a cathode of the second diode 4XM and a low-potential-side end of the second switching element 1XM, to connect a high-potential-side end of the inverter cell 100 and a high-potential-side end of the second capacitor 3XM of the lower arm, with a direction from the low-potential side toward the high-potential side being a forward direction.

In the power conversion apparatus of the present embodiment, in the switching operations of the switching elements 1U and 1X, the switching elements 1UN and 1UA and the switching elements 1XM and 1XB are the same as those in the above-described first embodiment. That is, the control circuit CTR controls the switching elements 1UN and 1UA of the upper arm and the switching elements 1XM and 1XB of the lower arm to be sequentially switched at predetermined time intervals.

In the present embodiment, with the above-described switching operation and the configuration of the regenerative rectification diodes 6UN, 6UA, 6XM, and 6XB, the energy stored in the capacitors 3UN, 3UA, 3XM, and 3XB of the switch circuits 101N, 101A, 102M, and 102B is charged to the floating capacitor 2 without intervention of the regenerative rectification diodes 6UN, 6UA, 6XM, and 6XB.

Thus, according to the power conversion apparatus of the present embodiment, losses such as a turn-on loss, a turn-off loss, and a recovery loss can be reduced, and the loss of energy decreases in the path that discharges energy from the capacitors 3UN, 3UA, 3XM, and 3XB to the floating capacitor 2, thereby regenerating energy more efficiently.

It is to be noted that in the power conversion apparatus of the present embodiment, since the voltage applied to the regenerative rectification diodes 6UN, 6UA, 6XM, and 6XB is higher than that in the circuit configuration of the power conversion apparatus of the above-described first embodiment, it is desirable that elements with higher breakdown voltages than those in the first embodiment be used as the regenerative rectification diodes 6UN, 6UA, 6XM, and 6XB.

In addition, the second circuits may be connected between the low-potential-side terminal of the lower-side switching element (low-potential-side end of the inverter cell 100) and low-potential-side ends of the first capacitors of the first switch circuits, with a direction from the low-potential side toward the high-potential side being a forward direction. The fourth circuits may be connected between the high-potential-side terminal of the upper-side switching element (high-potential-side end of the inverter cell 100) and the high-potential-side terminals of the second capacitors of the second switch circuits, with a direction from the low-potential side toward the high-potential side being a forward direction. In this case, the energy generated in the switching elements 1UN and 1XM is stored in the floating capacitor 2 without intervention of the capacitors 3Ua and 3Xb.

With the power conversion apparatus of the present embodiment, it is possible to obtain the same advantageous effects as those in the above-described first embodiment, as described above. That is, with the power conversion apparatus of the present embodiment, it is possible to suppress the energy loss to a low level, and to avoid an increase in size.

Next, a power conversion apparatus according to a third embodiment will be described in detail with reference to the drawings.

Figure 4:
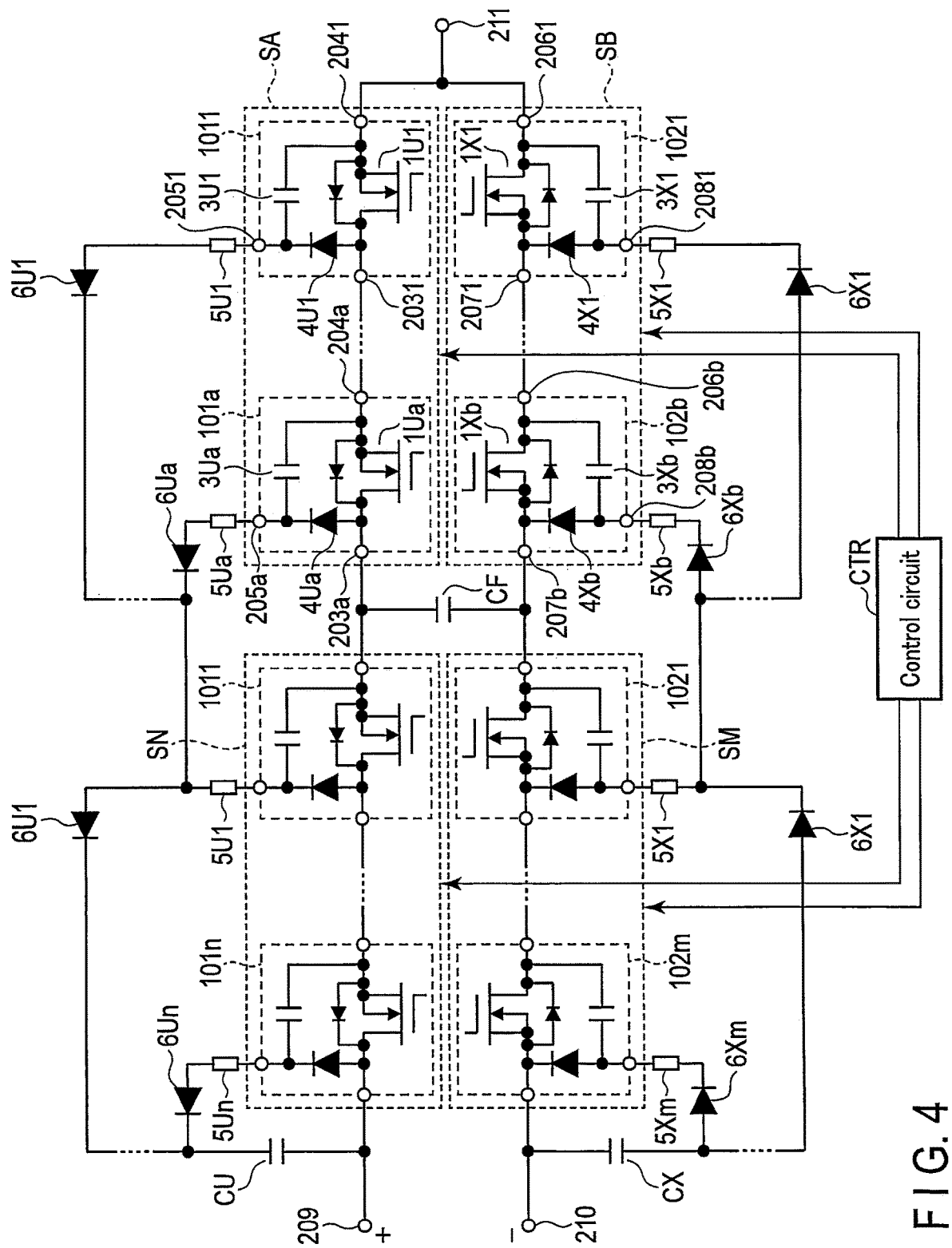
FIG. 4 is a diagram schematically showing a configuration example of a power conversion apparatus according to a third embodiment.

FIG. 4 is a diagram schematically showing a configuration example of the power conversion apparatus according to the third embodiment.

The power conversion apparatus according to the present embodiment is, for example, a three-level flying-capacitor-type power conversion apparatus capable of performing mutual conversion between DC power and single-phase AC power and including: a control circuit CTR; an upper arm; a lower arm; n+a first regenerative rectification circuits (regenerative rectification diodes 6UN and 6UA and first resistors 5UN and 5UA) (where n and a are integers equal to or greater than 2); m+b second regenerative rectification circuits (regenerative rectification diodes 6XM and 6XB and second resistors 5XM and 5XB) (where m and b are integers equal to or greater than 2); a flying capacitor CF; a positive DC terminal 209; a negative DC terminal 210; an AC terminal 211; and power storages CU and CX.

Here, N, A, M, and B respectively satisfy N=1 to n, A=1 to a, M=1 to m, B=1 to b (where n, a, m, and b are equal to or greater than 2), unless otherwise defined. The first resistors 5UN and 5UA and the second resistors 5XM and 5XB may be inductance elements.

For the power storages CU and CX, capacitors, batteries, etc. may be used. In the present embodiment, a case will be described where capacitors are used as the power storages CU and CX.

The high-potential-side power storage (first power storage) CU is electrically connected, at one end, to a positive DC terminal 209 and, at the other end, to a first regenerative rectification circuit. The low-potential-side power storage (second power storage) CX is electrically connected, at one end, to a negative DC terminal 210 and, at the other end, to a second regenerative rectification circuit.

The power conversion apparatus according to the present embodiment may comprise a DC/DC converter that converts energy stored in the power storages CU and CX into a predetermined voltage and discharges the voltage. An output end of the DC/DC converter may be, for example, connected to an illustrated control power supply, a direct-current source of the power conversion apparatus, or other circuits. The power conversion apparatus according to the present embodiment may comprise a DC/AC converter that converts energy stored in the power storages CU and CX into alternating-current power and discharges the alternating-current power. The operations of the DC/DC converter and the DC/AC converter are controlled by the control circuit CTR.

The upper arm includes n+a switch circuits (voltage-clamp-type switch circuits) 101N and 101A.

Each of the n+a switch circuits (first switch circuits) 101N and 101A includes switching elements (first switching elements) 1UN and 1UA, diodes (first diodes) 4UN and 4UA, capacitors (first capacitors) 3UN and 3UA, snubber terminals 205N and 205A, positive-side terminals 203N and 203A, and negative-side terminals 204N and 204A.

It suffices that the positive-side terminals 203N and 203A, the negative-side terminals 204N and 204A, and the snubber terminals 205N and 205A are configured to enable electrical connection of circuits at the positions of these terminals, and the terminals may be omitted. The switch circuits 101N and 101A may each include a plurality of switching elements 1UN and 1UA. In this case, the switching elements 1UN and 1UA are, between the positive-side terminals 203N and 203A and the negative-side terminals 204N and 204A, connected in parallel with the capacitors 3UN and 3UA and the diodes 4UN and 4UA. The switching elements 1UN and 1UA may be connected either in series or in parallel with each other.

The switching elements 1UN and 1UA are, for example, metal-oxide-semiconductor field-effect transistors (MOSFETs). The switching elements 1UN and 1UA are electrically connected, at drains (high-potential-side ends), to the positive-side terminals 203N and 203A, and connected, at sources (low-potential-side ends), to the negative-side terminals 204N and 204A.

The diodes 4UN and 4UA are electrically connected, at anodes, to drains of the switching elements 1UN and 1UA and the positive-side terminals 203N and 203A, and electrically connected, at cathodes, to the snubber terminals 205N and 205A. It is desirable that the diodes 4UN and 4UA have fast recovery characteristics with a low recovery loss, and be formed using, for example, a Schottky barrier diode (SBD) with good recovery characteristics or an element utilizing a wide bandgap semiconductor (e.g. SiC, GaN, etc.).

The capacitors 3UN and 3UA are electrically connected, at one of their ends (low-potential-side ends), to sources of the switching elements 1UN and 1UA and the negative-side terminals 204N and 204A, and are electrically connected, at the other of their ends (high-potential-side ends), to cathodes of the diodes 4UN and 4UA and the snubber terminals 205N and 205A.

The n+a switch circuits 101N and 101A are connected in series. That is, the switch circuits 101N and 101A are electrically connected, at positive-side terminals 203N and 203A, to negative-side terminals 204N and 204A of switch circuits 101N and 101A adjacent thereto on the high-potential side. On the other hand, the switch circuits 101N and 101A are electrically connected, at negative-side terminals 204N and 204A, to positive-side terminals 203N and 203A of switch circuits 101N and 101A adjacent thereto on the low-potential side.

Also, a positive-side terminal 203N of a switch circuit 101N on the highest-potential side is electrically connected to the positive DC terminal 209. A positive-side terminal 203A of a switch circuit 101A on the highest-potential side is electrically connected to a negative-side terminal 204N of a switch circuit 101N on the lowest-potential side. Also, a negative-side terminal 204A (A=1) of a switch circuit 101A on the lowest-potential side is electrically connected to the AC terminal 211 and the lower arm.

N regenerative rectification diodes (first regenerative rectification diodes) 6UN (N=1 to n) are connected between the snubber terminals 205N (N=1 to n) of the first switch circuit 101N and the other end (low-potential side end) of the storage unit CU on the high-potential side, with a direction from the low-potential side toward the high-potential side being a forward direction. In other words, the snubber terminal 205N of the first switch circuit 101N is electrically connected to an anode of the corresponding regenerative rectification diode 6UN. The other end of the power storage CU is electrically connected to cathodes of the regenerative rectification diodes 6U1 to 6Un.

The resistor 5UN is electrically connected, at one end, to a connecting point between the diode 4UN and the capacitor 3UN (part of a configuration that electrically connects the other end of the capacitor 3UN (high-potential-side end)) and a cathode of the diode 4UN. The other end of the resistor 5UN is electrically connected to the anode of the regenerative rectification diode 6UN.

The a regenerative rectification diodes (first regenerative rectification diodes) 6UA (A=1 to a) are connected between the snubber terminals 205A (A=1 to a) and the snubber terminal 205N (N=1) of the first switch circuit 101A, with a direction from the low-potential side toward the high-potential side being a forward direction. In other words, the snubber terminals 205A of the first switch circuit 101A are electrically connected to anodes of the corresponding regenerative rectification diodes 6UA. The snubber terminal 205N (N=1) is electrically connected to cathodes of the regenerative rectification diodes 6UA (A=1 to a) and an anode of the regenerative rectification diode 6UN (N=1).

The resistor 5UA is connected in series, at one end, to a connecting point between the diode 4UA and the capacitor 3UA (part of a configuration that electrically connects the other end of the capacitor 3UA (high-potential-side end)) and a cathode of the diode 4UA. The other end of the resistor 5UN is electrically connected to the anode of the regenerative rectification diode 6UA.

The lower arm includes m+b switch circuits (voltage-clamp-type switch circuits) 102M and 102B.

Each of the m+b switch circuits (second switch circuits) 102M and 102B includes switching elements (first switching elements) 1XM and 1XB, diodes (second diodes) 4XM and 4XB, capacitors (second capacitors) 3XM and 3XB, snubber terminals 208M and 208B, positive-side terminals 206M and 206B, and negative-side terminals 207M and 207B.

It suffices that the positive-side terminals 206M and 206B, the negative-side terminals 207M and 207B, and the snubber terminals 208M and 208B are configured to enable electrical connection of circuits at the positions of these terminals, and the terminals may be omitted. The switch circuits 102M and 102B may each include a plurality of switching elements 1XM and 1XB. In this case, the switching elements 1XM and 1XB are, between the positive-side terminals 206M and 206B and the negative-side terminals 207M and 207B, connected in parallel with the capacitors 3XM and 3XB and the diodes 4XM and 4XB. The switching elements 1XM and 1XB may be connected either in series or in parallel with each other.

The switching elements 1XM and 1XB are, for example, metal-oxide-semiconductor field-effect transistors (MOSFETs). The switching elements 1XM and 1XB are electrically connected, at drains (high-potential-side ends), to the positive-side terminals 206M and 206B, and electrically connected, at sources (low-potential-side ends), to the negative-side terminals 207M and 207B.

The diodes 4XM and 4XB are electrically connected, at cathodes, to sources of the switching elements 1XM and 1XB and the negative-side terminals 207M and 207B, and are electrically connected, at anodes, to the snubber terminals 208M and 208B. It is desirable that the diodes 4XM and 4XB have fast recovery characteristics with a low recovery loss, and be formed using, for example, a Schottky barrier diode (SBD) with good recovery characteristics or an element utilizing a wide bandgap semiconductor (e.g. SiC, GaN, etc.).

The capacitors 3XM and 3XB are, at one of their ends (low-potential-side ends), electrically connected to anodes of the diodes 4XM and 4XB and to the snubber terminals 208M and 208B, and are, at the other of their ends (high-potential-side ends), electrically connected to drains of the switching elements 1XM and 1XB and the positive-side terminals 206M and 206B.

The m+b switch circuits 102M and 102B are connected in series. That is, the switch circuits 102M and 102B are electrically connected, at positive-side terminals 206M and 206B, to negative-side terminals 207M and 207B of the switch circuits 102M and 102B adjacent thereto on the high-potential side. On the other hand, the switch circuits 102M and 102B are electrically connected, at negative-side terminals 207M and 207B, to positive-side terminals 206M and 206B of switch circuits 102M and 102B adjacent thereto on the low-potential side.

Also, a positive-side terminal 206B of a switch circuit 102B (B=1) on the highest-potential-side is electrically connected to the AC terminal 211 and the upper arm. A positive-side terminal 206M of a switch circuit 102M (M=1) on the highest-potential side is electrically connected to the negative-side terminal 207B of the lowest-potential side switch circuit 102B (B=b). A negative-side terminal 207M (M=m) of a switch circuit 102M (M=m) on the lowest-potential side is electrically connected to the negative DC terminal 210.

The m regenerative rectification diodes (second regenerative rectification diodes) 6XM (M=1 to m) are connected between one end (high-potential-side end) of the power storage CX on the low potential side and snubber terminals 208M (M=1 to m) of the second switch circuit 102M, with a direction from the low-potential side toward the high-potential side being a forward direction. In other words, the snubber terminal 208M of the second switch circuit 102M is electrically connected to a cathode of the corresponding regenerative rectification diode 6XM. One end of the power storage CX is electrically connected to cathodes of the regenerative rectification diodes 6X1 to 6Xm.

The resistor 5XM is electrically connected, at one end, to a connecting point between a diode 4XM and a capacitor 3XM (part of a configuration that electrically connects one end (low-potential-side end) of the capacitor 3XM and an anode of the diode 4XM). The other end of the resistor 5XM is electrically connected to a cathode of the regenerative rectification diode 6XM.

The b regenerative rectification diodes (second regenerative rectification diodes) 6XB (B=1 to b) are connected between the snubber terminal 208M (M=1) and the snubber terminals 208B (B=1 to b) of the second switch circuit 102B, with a direction from the low-potential side toward the high-potential side being a forward direction. In other words, the snubber terminal 208B of the second switch circuit 102B is electrically connected to a cathode of the corresponding regenerative rectification diode 6XB. The snubber terminal 208M (M=1) is electrically connected to anodes of the regenerative rectification diodes 6XB (B=1 to b) and cathodes of the regenerative rectification diodes 6XM (M=1).

The resistor 5XB is connected in series, at one end, to a connecting point between a diode 4XB and a capacitor 3XB (part of a configuration that electrically connects one end (low-potential-side end) of the capacitor 3XB and an anode of the diode 4XB). The other end of the resistor 5XB is electrically connected to a cathode of the regenerative rectification diode 6XB.

The power conversion apparatus according to the present embodiment comprises a first regenerative rectification circuit configured, if at least one of first switch circuits 101N and 101A includes first diodes 4UN and 4UA connected, at anodes, to low-potential-side ends of first switching elements 1UN and 1UA, and first capacitors 3UN and 3UA connected between cathodes of the first diodes 4UN and 4UA and the low-potential-side ends of the first switching elements 1UN and 1UA, to connect cathodes of the first diodes 4UN and the other end (low-potential-side end) of the high-potential-side power storage CU, with a direction from the first switch circuits 101U and 101A toward the high-potential-side power storage CU being a forward direction.

The power conversion apparatus according to the present embodiment includes a second regenerative rectification circuit configured, if at least one of second switch circuits 102M and 102B includes second diodes 4XM and 4XB connected, at cathodes, to low-potential-side ends of second switching elements 1XM and 1XB, and second capacitors 3XM and 3XB connected between anodes of the second diodes 4XM and 4XB and high-potential-side ends of the second switching elements 1XM and 1XB, to connect anodes of the second diodes 4XM and 4XB and the other end (high-potential-side end) of the low-potential-side power storage CX, with a direction from the low-potential-side power storage CX to the second switch circuits 102M and 102B being a forward direction.

In the power conversion apparatus of the present embodiment, the switching elements 1UN, 1UA, 1XM and 1XB are not limited to MOSFETs, and may be insulated-gate bipolar transistors (IGBTs), contactors, mechanical switches, or the like.

Besides, although advantageous effects of the present embodiment can be obtained even by using elements with various voltage ratings or current ratings as the switching elements 1UN, 1UA, 1XM and 1XB, it is desirable to use elements with the same voltage rating and current rating as the switching elements 1UN, 1UA, 1XM and 1XB.

Next, an example of the operation of the power conversion apparatus of the present embodiment will be described.

In each of the upper arm and the lower arm, the operations of the switching elements 1UN, 1UA, 1XM, and 1XB are controlled by the control circuit CTR, similarly to the first embodiment. That is, the control circuit CTR performs control to sequentially switch the switching elements 1UN, 1UA, 1XM, and 1XB at predetermined time intervals in each of the upper arm circuit and the lower arm circuit, in such a manner that the elements are not switched simultaneously.

In this case, a load current flows through the arms during a time period (delay time) from when one of the switching elements 1UN, 1UA, 1XM, and 1XB is turned on until the next one is turned on. In the switch circuits 101N, 101A, 102M, and 102B in which the switching elements 1UN, 1UA, 1XM, and 1XB are turned off, the load current flows through diodes (rectification devices) 4UN, 4UA, 4XM, and 4XB connected in parallel with the switching elements 1UN, 1UA, 1XM, and 1XB or the regenerative rectification circuit. The current flowing through the regenerative rectification circuit is stored as energy in the power storages CU and CX.

In the upper arm, by turning on one of the switching elements 1UA and all the switching elements 1UA connected on the high-potential side with reference to said one switching element 1UA, the capacitor 3UA connected in parallel with said one switching element 1UA and the capacitor 3UN (N=1) are connected in parallel. With an increase in the voltage of the capacitor 3UA through the storage of the energy by means of a load current, a current flows from the capacitor 3UA to the capacitor 3UN (N=1), thereby causing the energy to be discharged to (regenerated in) the capacitor 3UN (N=1). The regenerative efficiency of the energy in this case depends on a voltage difference between the capacitor 3UA and the capacitor 3UN (N=1); that is, the smaller the voltage difference, the higher the efficiency.

In the upper arm, by turning on one of the switching elements 1UN and all the switching elements 1UN connected on the high-potential side with reference to said one switching element 1UN, the capacitor 3UN connected in parallel with said one switching element 1UN and the power storage CU are connected in parallel. With an increase in the voltage of the capacitor 3UN through the storage of the energy by means of a load current, a current flows from the capacitor 3UN to the power storage CU, thereby causing the energy to be discharged to (regenerated in) the power storage CU. The regenerative efficiency of the energy in this case depends on a voltage difference between the capacitor 3UN and the power storage CU; that is, the smaller the voltage difference, the higher the efficiency.

As described above, energy is accumulated from all the capacitors 3UN and 3UA of the upper arm into the power storage CU. The energy stored in the power storage CU is discharged by, for example, a DC/DC converter (not illustrated), and may be used for a direct-current power supply, a control power supply, or the like. Also, by discharging the energy stored in the power storage CU with a DC/DC converter, it is possible to avoid an increase in the voltage of the power storage CU.

In the lower arm, by turning on one of the switching elements 1XB and all the switching elements 1XB connected to the low-potential side with reference to said one switching element 1XB, the capacitor 3XB connected in parallel with said one switching element 1XB and the capacitor 3XM (M=1) are connected in parallel. With an increase in the voltage of the capacitor 3XB through the storage of the energy by means of a load current, a current flows from the capacitor 3XB to the capacitor 3XM (M=1), thereby causing the energy to be discharged to (regenerated in) the capacitor 3XM (M=1). The regenerative efficiency of the energy in this case depends on a voltage difference between the capacitor 3XB and the capacitor 3XM (M=1); that is, the smaller the voltage difference, the higher the efficiency.

In the lower arm, by turning on one of the switching elements 1XM and all the switching elements 1XM connected to the low-potential side with reference to said one switching element 1XM, the capacitor 3XM connected in parallel with said one switching element 1XM and the power storage CX are connected in parallel. With an increase in the voltage of the capacitor 3XM through the storage of the energy by means of a load current, a current flows from the capacitor 3XM to the power storage CX, thereby causing the energy to be discharged to (regenerated in) the power storage CX. The regenerative efficiency of the energy in this case depends on a voltage difference between the capacitor 3XM and the power storage CX; that is, the smaller the voltage difference, the higher the efficiency.

As described above, energy is accumulated from all the capacitors 3XM and 3XB of the lower arm into the power storage CX. The energy stored in the power storage CX is discharged by, for example, a DC/DC converter (not illustrated), and may be used for a direct-current power supply, a control power supply, or the like. Also, by discharging the energy stored in the power storage CX with a DC/DC converter, it is possible to avoid an increase in the voltage of the power storage CX.

Next, an effect of improvement in energy loss of the power conversion apparatus according to the present embodiment will be described. In a conventional power conversion apparatus, for example, at a timing when a switching element is turned on, a current flowing through the switching element increases, and a voltage applied to the switching element decreases. The energy generated in the switching element by the current flowing through the switching element and the voltage applied to the switching element becomes heat without being absorbed by other elements, thus causing a switching loss.

On the other hand, in the power conversion apparatus according to the present embodiment, energy is generated at the time of turning-on, similarly to the conventional technique, when consideration is given to each switching element; however, when consideration is given to the entirety of both arms, the energy generated at the time of switching is absorbed by the power storages CU and CX via the capacitors 3UN, 3UA, 3XM, and 3XB. The energy stored in the power storages CU and CX may be discharged and regenerated by, for example, a DC/DC converter. Thereby, only part of the energy generated at the time of turning-on of the switching elements 1UN, 1UA, 1XM, and 1XB becomes a loss in terms of the entirety of both arms, thereby improving the energy efficiency.

In a conventional power conversion apparatus, at a timing when a switching element is turned off, a voltage applied to the switching element increases, and a current flowing through the switching element decreases. In this manner, the energy generated in the switching element by the current flowing through the switching element and the voltage applied to the switching element becomes heat without being absorbed by other elements, thus causing a switching loss.

On the other hand, in the power conversion apparatus according to the present embodiment, energy is generated at the time of turning off, similarly to the conventional technique, when consideration is given to each switching element; however, when consideration is given to the entirety of both arms, the energy generated at the time of switching is absorbed by the power storages CU and CX via the capacitors 3UN, 3UA, 3XM, and 3XB. The energy stored in the power storages CU and CX may be discharged and regenerated by, for example, a DC/DC converter. Thereby, only part of the energy generated at the time of turning-off of the switching elements 1UN, 1UA, 1XM, and 1XB becomes a loss in terms of the entirety of both arms, thereby improving the energy efficiency.

In a conventional power conversion apparatus, if a switching element of a lower arm is turned on, for example, a recovery loss is caused by a current flowing in a parasitic diode at the time of recovery of a parasitic diode of a switching element of an upper arm and an applied voltage.

On the other hand, in the power conversion apparatus according to the present embodiment, by causing the control circuit CTR to turn on one of the switching elements 1XM, a voltage applied to one of the switch circuits 102M is divided among the number (=n) of the switch circuits 101N connected in series, and the divided voltages are applied to the respective switch circuits 101N. This causes a decrease in the voltage applied at the time of recovery of the parasitic diodes of the switching elements 1UN of the switch circuits 101N, and causes a decrease in loss (recovery loss) that occurs at the time of recovery.

As described above, the power conversion apparatus according to the present embodiment is configured to regenerate and utilize energy that has conventionally been a loss in a conventional power conversion apparatus, thereby achieving high-efficiency switching. Also, in the power conversion apparatus according to the present embodiment, the switching speed of the switching elements 1UN, 1UA, 1XM, and 1XB by means of the control circuit CTR is equal to that of the conventional power conversion apparatus, thus reducing a loss without increasing the switching speed.

Also, if the power conversion apparatus includes a plurality of legs, for example, there is no necessity to provide power storages CU and CX and a DC/DC converter in each phase. A power conversion apparatus in which there are multiple (two or more) phases can be realized by using one power storage and one DC/DC converter on each of the high-potential side and the low-potential side. This realizes a reduction in the size and cost of the power conversion apparatus.

That is, according to the present embodiment, it is possible to provide a power conversion apparatus and a switch apparatus capable of suppressing the energy loss to a low level, and avoiding an increase in size.

It is to be noted that, in the power conversion apparatus according to the present embodiment, it is desirable, between the positive DC terminal 209 and the AC terminal 211, that the capacitor 3UN (N=1) connected between the flying capacitor CF and a source (or emitter) of the switching element 1UN (N=1) have a larger electrostatic capacity than the other capacitors 3UN and 3UA for temporarily storing the energy absorbed from the capacitors 3UA of the first upper arm circuit SA.

Also, it is desirable, between the negative DC terminal 210 and the AC terminal 211, that the capacitor 3XM(M=1) connected between the flying capacitor CF and a drain (or collector) of the switching element 1XM (M=1) have an electrostatic capacity larger than those of the other capacitors 3XM and 3XB for temporarily storing the energy absorbed from the capacitors 3XB of the first lower arm circuit SB.

It is to be noted that, in the power conversion apparatus shown in FIG. 4, the energy generated in the switch circuits of the upper arm is absorbed into the power storage CU, and the energy generated in the switch circuit of the lower arm is absorbed into the power storage CX; however, the regenerative rectification circuit may be configured in such a manner that the energy generated in the switch circuits of the upper arm and the lower arm is absorbed into one of the power storages CU and CX. Even in such a case, an advantageous effect similar to that of the power conversion apparatus shown in FIG. 4 can be obtained. In such a case, the switch circuits 101N, 101A, 102M, and 102B can have the same configuration, and the other one of the power storages CU and CX may be omitted.

Next, a power conversion apparatus according to a fourth embodiment will be described in detail with reference to the drawings.

Figure 5:
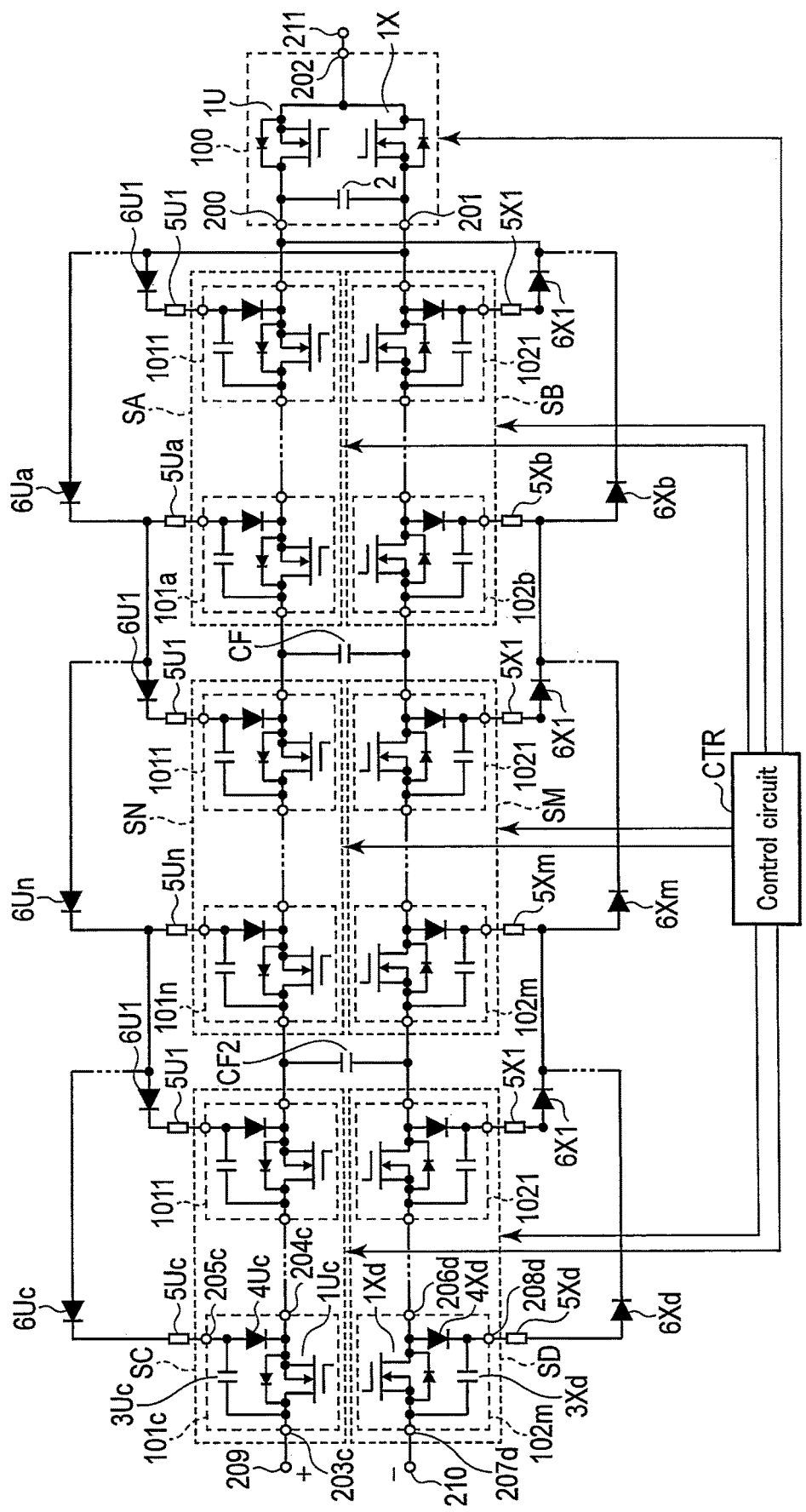
FIG. 5 is a diagram schematically showing a configuration example of a power conversion apparatus according to a fourth embodiment.

FIG. 5 is a diagram schematically showing a configuration example of the power conversion apparatus according to the fourth embodiment.

The power conversion apparatus according to the present embodiment is, for example, a four-level flying-capacitor-type power conversion apparatus capable of performing mutual conversion between DC power and single-phase AC power and including: a control circuit CTR; an inverter cell 100; an upper arm; a lower arm; n+a+c first regenerative rectification circuits (regenerative rectification diodes 6UN, 6UA and 6UC, and first resistors 5UN, 5UA, and 5UC) (where n, a, and c are integers equal to or greater than 2); m+b+d second regenerative rectification circuits (regenerative rectification diodes 6XM, 6XB, and 6XD and second resistors 5XM, 5XB, and 5XD) (where m, b, and d are integers equal to or greater than 2); flying capacitors CF and CF2; a positive DC terminal 209; a negative DC terminal 210; and an AC terminal 211.

Here, N, A, C, M, B, and D respectively satisfy N=1 to n, A=1 to a, C=1 to c, M=1 to m, B=1 to b, D=1 to d (n, a, c, m, b, and d are equal to or greater than 2), unless otherwise defined. The first resistors 5UN, 5UA, and 5UC and the second resistors 5XM, 5XB, and 5XD may be inductance elements.

The upper arm of the power conversion apparatus according to the present embodiment includes a first upper arm circuit SA, a second upper arm circuit SN, and a third upper arm circuit SC. The first upper arm circuit SA includes a switch circuits (voltage-clamp-type switch circuits) 101A. The second upper arm circuit SN includes n switch circuits (voltage-clamp-type switch circuits) 101N. The third upper arm circuit SC includes c switch circuits (voltage-clamp-type switch circuits) 101C.

The lower arm of the power conversion apparatus according to the present embodiment includes a first lower arm circuit SB, a second lower arm circuit SM, and a third lower arm circuit SD. The first lower arm circuit SB includes b switch circuits (voltage-clamp-type switch circuits) 102B. The second lower arm circuit SM includes m switch circuits (voltage-clamp-type switch circuits) 102M. The third lower arm circuit SD includes d switch circuits (voltage-clamp-type switch circuits) 102D.

Each of the c switch circuits (first switch circuits) 101C has a configuration similar to that of the switch circuits 101N and 101A. That is, the switch circuit 101C includes a switching element (first switching element) 1UC, a diode (first diode) 4UC, a capacitor (first capacitor) 3UC, a snubber terminal 205C, a positive-side terminal 203C, and a negative-side terminal 204C.

It suffices that the snubber terminal 205C, the positive-side terminal 203C, and the negative-side terminal 204C are configured to enable electrical connection of circuits at the positions of these terminals, and the terminals may be omitted. The switch circuit 101C may include a plurality of switching elements 1UC. In this case, the switching elements 1UC are, between the positive-side terminal 203C and the negative-side terminal 204C, connected in parallel with the capacitor 3UC and the diode 4UC. The switching elements 1UC may be connected either in series or in parallel with each other.

The switching element 1UC is, for example, a MOSFET. A drain (high-potential-side end) of the switching element 1UC is electrically connected to the positive-side terminal 203C, and a source (low-potential-side end) of the switching element 1UC is electrically connected to the negative-side terminal 204C.

The diode 4UC is electrically connected, at a cathode, to a source of the switching element 1UC and the negative-side terminal 204C, and is electrically connected, at an anode, to the snubber terminal 205C. It is desirable that the diode 4UC have fast recovery characteristics with a low recovery loss, and be formed using, for example, a Schottky barrier diode (SBD) with good recovery characteristics or an element utilizing a wide bandgap semiconductor (e.g. SiC, GaN, etc.).

The capacitor (snubber capacitor) 3UC is electrically connected, at one end (high-potential-side end), to a drain of the switching element 1UN and the positive-side terminal 203C, and is electrically connected, at the other end (low-potential-side end), to an anode of the diode 4UC and the snubber terminal 205C.

The c switch circuits 101C are connected in series. That is, a switch circuit 101C is electrically connected, at a positive-side terminal (high-potential-side end) 203C, to a negative-side terminal (low-potential-side end) 204C of a switch circuit 101C adjacent thereto on the high-potential side, and a switch circuit 101C on the highest-potential side is electrically connected, at a positive-side terminal 203C (C=c), to the positive DC terminal 209. A switch circuit 101C is electrically connected, at a negative-side terminal 204C, to a positive-side terminal 203C of a switch circuit 101C adjacent thereto on the low-potential side, and a switch circuit 101C on the lowest-potential side is electrically connected, at a negative-side terminal 204C (C=1), to a positive-side terminal 203N (N=n) of a switch circuit 101N on the highest-potential side.

In the power conversion apparatus according to the present embodiment, the first regeneration rectifying circuit has a configuration the same as that of the first regeneration rectification circuit in the power conversion apparatus according to the second embodiment.

The c regenerative rectification diodes 6UC (C=1 to c) are connected between a low-potential-side end of the capacitor 3Un of a first switch circuit 101N (N=n) on the highest-potential side and a low-potential-side end of a capacitor 3UC of a first switch circuit 101C(C=1), with a direction from the low-potential side toward the high-potential side being a forward direction.

Cathodes of the regenerative rectification diodes (first regenerative rectification diodes) 6UC (C=1 to c) are respectively electrically connected to snubber terminals 205C (C=1 to c) of the switch circuit 101C. Anodes of the regenerative rectification diodes 6UC (C=1 to c) are electrically connected to a low-potential-side end of a capacitor 3UN (N=n) of the switch circuit 101N (N=n). That is, the low-potential-side end of the capacitor 3UN (N=n) is electrically connected to anodes of the regenerative rectification diodes 6UC (C=1 to c).

The resistor 5UC is connected in series, at one end, to a connecting point between an anode of a diode 4UC and a capacitor 3UC (part of a configuration that electrically connects one end (low-potential-side end) of the capacitor 3UC and an anode of the diode 4UC). The other end of the resistor 5UC is electrically connected to a cathode of the regenerative rectification diode 6UC. The other end of the resistor 5UC of the switch circuit 101C (C=1) arranged on the lowest-potential side is electrically connected, via the regenerative rectification diode 6UC (C=1), to the circuit in which the capacitor 3Un of the switch circuit 101n and the resistor 5Un are connected in series.

Each of the d switch circuits (second switch circuits) 102D has a configuration similar to that of the switch circuits 102M and 102B. That is, the switch circuit 102D includes a switching element (second switching element) 1XD, a diode (second diode) 4XD, a capacitor (second capacitor) 3XD, a snubber terminal 208D, a positive-side terminal 206D, and a negative-side terminal 207D.

It suffices that the positive-side terminal 206D, the negative-side terminal 207D, and the snubber terminal 208D are configured to enable electrical connection of circuits at the positions of these terminals, and the terminals may be omitted. The switch circuit 102D may include a plurality of switching elements 1XD. In this case, the switching elements 1XD are, between the positive-side terminal 206D and the negative-side terminal 207D, connected in parallel with the capacitor 3XD and the diode 4XD. The switching elements 1XD may be connected either in series or in parallel with each other.

The switching element 1XD is, for example, a MOSFET. The switching element 1XD is electrically connected, at a drain (high-potential-side end), to the positive-side terminal 206D, and electrically connected, at a source (low-potential-side end), to the negative-side terminal 207D.

The diode 4XD is electrically connected, at an anode, to a drain of the switching element 1XD and the positive-side terminal 206D, and electrically connected, at a cathode, to the snubber terminal 208D. It is desirable that the diode 4XD have fast recovery characteristics with a low recovery loss, and be formed using, for example, a Schottky barrier diode (SBD) with good recovery characteristics or an element utilizing a wide bandgap semiconductor (e.g. SiC, GaN, etc.).

The capacitor (snubber capacitor) 3XD is electrically connected, at one end (low-potential-side end), to a source of the switching element 1XM and the negative-side terminal 207D, and is electrically connected, at the other end (high-potential-side end), to a cathode of the diode 4XD and to the snubber terminal 208D.

The d switch circuits 102D are connected in series. That is, a switch circuit 102D is electrically connected, at a positive-side terminal 206D, to a negative-side terminal 207D of a switch circuit 102D adjacent thereto on the high-potential side, and a switch circuit 102D on the highest-potential side is electrically connected, at a positive-side terminal 206D (D=1), to a negative-side terminal 207M (M=m) of a switch circuit 102M on the lowest-potential side. The switch circuit 102D is electrically connected, at a negative-side terminal 207D, to a positive-side terminal 206D of a switch circuit 102D adjacent thereto on the low-potential side, and a switch circuit 102D on the lowest-potential side is electrically connected, at a negative-side terminal 207D (D=d), to the negative DC terminal 210.

In the power conversion apparatus according to the present embodiment, the second regeneration rectification circuit has a configuration the same as that of the second regeneration rectification circuit in the power conversion apparatus according to the second embodiment.

The d regenerative rectification diodes (second regenerative rectification diodes) 6XD (D=1 to d) are connected between a high-potential-side end of a capacitor 3Xm of a second switch circuit 102M (M=m) on the lowest-potential side and a low-potential-side end of a capacitor 3XD of the second switch circuit 102D.

Cathodes of the regenerative rectification diodes 6XD (D=1 to d) are respectively electrically connected to snubber terminals 208D (D=1 to d) of the switch circuit 102D. Cathodes of the regenerative rectification diodes 6XD (D=1 to d) are electrically connected to a high-potential-side end of a capacitor 3Xm of a second switch circuit 102M (M=m) on the lowest-potential side. That is, a high-potential-side end of a capacitor 3UM (M=m) is electrically connected to anodes of regenerative rectification diodes 6XD (D=1 to d).

The resistor 5XD is connected in series, at one end, to a connecting point between a cathode of a diode 4XD and a capacitor 3XD (part of a configuration that electrically connects one end (high-potential-side end) of the capacitor 3XD and an anode of the diode 4XD). The other end of the resistor 5XD is electrically connected to the anode of the regenerative rectification diode 6UC. The resistor 5XD of the switch circuit 102D (D=1) arranged on the highest-potential side is electrically connected, at the other end, to the circuit in which the capacitor 3Xm of the switch circuit 102m and the resistor 5Xm are connected in series via the regenerative rectification diode 6XD (D=1).

That is, the power conversion apparatus according to the present embodiment includes a regenerative rectification circuit configured, if at least one of first switch circuits 101N, 101A, and 101C includes first diodes 4UN, 4UA, and 4UC connected, at cathodes, to low-potential-side ends of first switching elements 1UN, 1UA, and 1UC and first capacitors 3UN, 3UA, and 3UC connected between anodes of the first diodes 4UN, 4UA, and 4UC and high-potential-side ends of the first switching elements 1UN, 1UA, and 1UC, to connect a low-potential-side end of the inverter cell 100 and low-potential-side ends of the first capacitors 3UN, 3UA, and 3UC of the upper arm, with a direction from the low-potential side toward the high-potential side being a forward direction.

Also, the power conversion apparatus according to the present embodiment includes a regenerative rectification circuit configured, if at least one of second switch circuits 102M, 102B, and 102D includes second diodes 4XM, 4XB, and 4XD connected, at anodes, to high-potential-side ends of second switching elements 1XM, 1XB, and 1XD and second capacitors 3XM, 3XB, and 3XD connected between cathodes of the second diodes 4XM, 4XB, and 4XD and low-potential-side ends of the second switching elements 1XM, 1XB, and 1XD, to connect a high-potential-side end of the inverter cell 100 and high-potential-side ends of the second capacitors 3XM, 3XB, and 3XD of the lower arm, with a direction from the low-potential side toward the high-potential side being a forward direction.

It is to be noted that, in the power conversion apparatus of the present embodiment, it is desirable that the number c of switch circuits 101C and the number d of switch circuits 102D be equal; however, the numbers c and d may be different.

In the power conversion apparatus of the present embodiment, the switching elements 1UC and 1XD are not limited to MOSFETs, and may be, for example, Insulated Gate Bipolar transistors (IGBTs), mechanical switches, or the like.

Moreover, although advantageous effects of the present embodiment can be obtained even by using elements with various voltage ratings or current ratings as the switching elements 1U, 1X, 1UN, 1UA, 1UC, 1XM, 1UB, and 1XD, it is desirable to use elements with the same voltage rating and current rating as the switching elements 1U, 1X, 1UN, 1UA, 1UC, 1XM, 1UB, and 1XD.

The flying capacitor CF2 is electrically connected, at a high-potential-side end, to an upper arm between a negative-side terminal 204C of a first switch circuit 101C (C=1) on the lowest-potential side and a positive-side terminal 203N of a first switch circuit 101N (N=n) on the highest-potential side. The flying capacitor CF2 is electrically connected, at a low-potential-side end, to a lower arm between a positive-side terminal 206D of a second switch circuit 102D (D=1) on the highest-potential side and a negative-side terminal 207M of a second switch circuit 102M (M=m) on the lowest-potential side.

It is desirable that capacitors 3Ua and 3Un of switch circuits 101a and 101n, which are located between the positive DC terminal 209 and the AC terminal 211, and to which the flying capacitors CF and CF2 and a drain (or a collector) of a switching element is connected, and capacitors 3Xb and 3Xm of switch circuits 102b and 102m, which are located between the negative DC terminal 210 and the AC terminal 211, and to which the flying capacitors CF and CF2 and a source (or an emitter) of a switching element is connected, have electrostatic capacitances larger than those of the other capacitors 3UN, 3UA, 3UC, 3XB, 3XM, and 3XD, in order to temporarily buffer the absorbed energy.

Next, an example of the operation of the power conversion apparatus of the present embodiment will be described.

The power conversion apparatus according to the present embodiment is configured to store various voltages with the flying capacitors CF and CF2, and to allow for multi-level outputs through addition and subtraction of voltage values.

Figure 6:
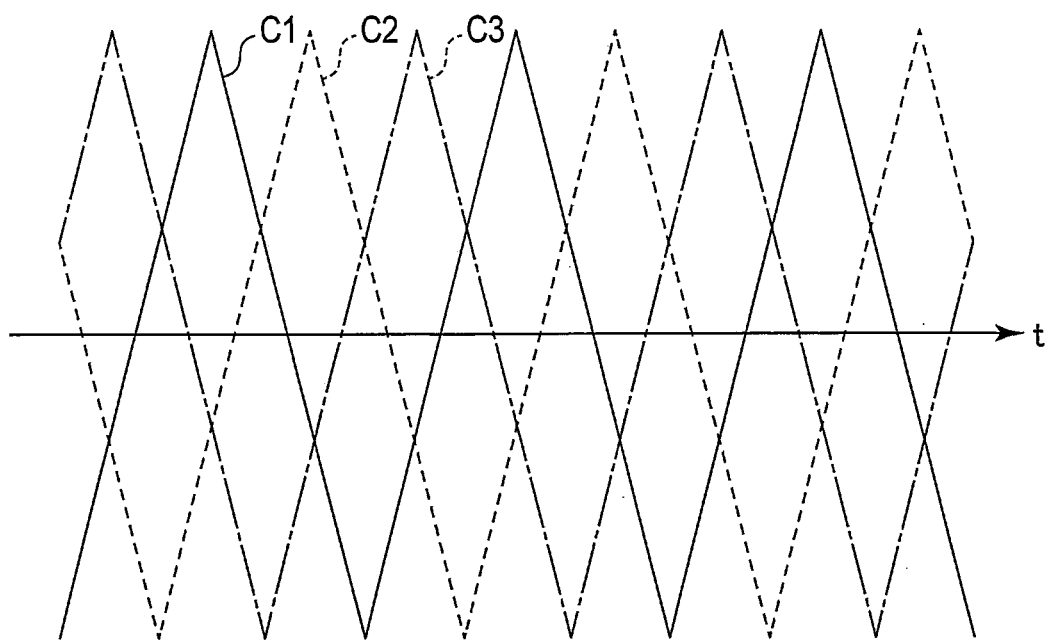
FIG. 6 is a diagram illustrating an example of an operation of the power conversion apparatus according to the fourth embodiment.

FIG. 6 is a diagram illustrating an example of an operation of the power conversion apparatus according to the fourth embodiment.

In the present embodiment, the control circuit CTR generates control signals of the first upper arm circuit SA, the second upper arm circuit SN, the third upper arm circuit SC, the first lower arm circuit SB, the second lower arm circuit SX, the third lower arm circuit SD, and the switching elements 1U and 1X by a carrier phase-shift modulation scheme using carrier waves C3, C4, and C5 with phases that are shifted from each other by approximately 120 degrees.

The control signals of the third upper arm circuit SC and the third lower arm circuit SD are generated by, for example, comparing the carrier wave C3 and a command value. The control signals of the second upper arm circuit SN and the second lower arm circuit SM are generated by, for example, comparing the carrier wave C4 and a command value. The control signals of the first upper arm circuit SA and the first lower arm circuit SB are generated by, for example, comparing the carrier wave C5 and a command value.

In a four-level flying-capacitor-type power conversion apparatus, by causing the control circuit CTR to make the voltage of the flying capacitor CF2 two-thirds of the direct-current voltage (Ed) and making the voltage of the flying capacitor CF one-third of the direct-current voltage, four levels of voltages (Ed, 2Ed/3, Ed/3, and −Ed) can be selectively output to the AC terminals of the power conversion apparatus.

In the power conversion apparatus according to the present embodiment, the control circuit CTR is capable of accumulating energy generated at the time of switching into the floating capacitor 2, similarly to the above-described second embodiment. That is, in the power conversion apparatus according to the present embodiment, the control circuit CTR controls the switching elements 1UN, 1UA, 1UC, 1UB, 1XM, and 1XD of each of the upper arm circuits SN, SA, and SC and the lower arm circuits SB, SM, and SD to be sequentially switched at predetermined time intervals, thereby reducing losses such as a turn-on loss, a turn-off loss, and a recovery loss.

As described above, with the power conversion apparatus of the present embodiment, it is possible to, for example, store much of the energy at the time of switching, which is a loss in the conventional inverter, in the floating capacitor 2 via the capacitors 3UN, 3UA, 3UC, 3XM, 3XB, and 3XD, and to reduce the switching loss by discharging the floating capacitor 2 without increasing the switching speed. In addition, by applying a low voltage to the switching elements 1UN, 1UA, 1UC, 1XM, 1XB, and 1XD at the time of recovery of the parasitic diodes of the switching elements 1UN, 1UA, 1UC, 1XM, 1XB, and 1XD, it is possible to reduce a recovery loss. That is, the power conversion apparatus according to the present embodiment is capable of improving a tradeoff between the switching loss and the capacity of the flying capacitors CF and CF2.

It is to be noted that, since all the switching elements are switched in a cycle of a carrier wave in the power conversion apparatus according to the present embodiment, the capacitors 3UN, 3UA, 3UC, 3XM, 3XB, and 3XD are capable of accumulating energy in the floating capacitor 2 without storing the absorbed energy over multiple cycles. That is, in the present embodiment, there is no switching mode in which the capacitors 3UN, 3UA, 3UC, 3XM, 3XB, and 3XD increase in size, thus preventing the power conversion apparatus from increasing in size.

In the above-described fourth embodiment, the power conversion apparatus includes an inverter cell 100; however, a similar advantageous effect is obtained by configuring the power conversion apparatus according to the third embodiment as a four-level flying-capacitor-type power conversion apparatus. Similar effects can be obtained by configuring the power conversion apparatus according to the first to fourth embodiments as a multi-level (five-or-more-level) flying-capacitor-type power conversion apparatus.

As described above, according to the present embodiment, it is possible to provide a power conversion apparatus capable of suppressing the energy loss to a low level and avoiding an increase in size.

While certain embodiments have been described, these embodiments have been presented by way of example only, and are not intended to limit the scope of the inventions. Indeed, the new embodiments described herein may be embodied in a variety of other forms, and various omissions, substitutions, and changes in the form of the embodiments described herein may be made without departing from the spirit of the inventions. The accompanying claims and their equivalents are intended to cover such forms or modifications as would fall within the scope and spirit of the inventions.

For example, in the above-described embodiments, there is no necessity that every one of the first switch circuits includes a first diode and a first capacitor, and that every one of the second switch circuits includes a second diode and a second capacitor. It suffices that at least one of the first switch circuits of the upper arm includes a first diode and a first capacitor, and at least one of the second switch circuits of the lower arm includes a second diode and a second capacitor. Even in such a case, it is possible to obtain the same advantageous effect as that of the above-described embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A power conversion apparatus comprising:
    a power storage;
    an upper arm including, between an alternating-current terminal and a positive direct-current terminal, a first upper arm circuit and a second upper arm circuit connected in series;
    a lower arm including, between the alternating-current terminal and a negative direct-current terminal, a first lower arm circuit and a second lower arm circuit connected in series; and
    a flying capacitor electrically connected, between the first upper arm circuit and the second upper arm circuit, to the upper arm, and electrically connected, between the first lower arm circuit and the second lower arm circuit, to the lower arm, wherein
    each of the first upper arm circuit and the second upper arm circuit is configured in such a manner that one or more first switch circuits each including a first switching element are connected in series,
    each of the first lower arm circuit and the second lower arm circuit is configured in such a manner that one or more second switch circuits each including a second switching element are connected in series,
    at least one of the first switch circuits includes a first capacitor connected in parallel with the first switching element, or at least one of the second switch circuits includes a second capacitor connected in parallel with the second switching element, and
    the power conversion apparatus further comprises:
        a first regenerative rectification circuit configured, if at least one of the first switch circuits includes the first capacitor connected in parallel with the first switching element, to cause the first capacitor to be connected in parallel with the power storage via the first switching element; and
        a second regenerative rectification circuit configured, if at least one of the second switch circuits includes the second capacitor connected in parallel with the second switching element, to cause the second capacitor to be connected in parallel with the power storage via the second switching element;
    wherein a voltage of the flying capacitor is smaller than a sum of voltages of the capacitors of the upper arm, and smaller than a sum of voltages of the capacitors of the lower arm.

2. The power conversion apparatus according to claim 1, wherein
    the first regenerative rectification circuit is configured, if at least one of the first switch circuits includes a first diode connected, at a cathode, to a low-potential-side terminal of the first switching element, and the first capacitor connected between an anode of the first diode and a high-potential-side terminal of the first switching element, to connect a low-potential-side terminal of the power storage and a low-potential-side terminal of the first capacitor, and
    the second regenerative rectification circuit is configured, if at least one of the second switch circuits includes a second diode connected, at an anode, to a high-potential-side terminal of the second switching element, and the second capacitor connected between a cathode of the second diode and a low-potential-side terminal of the second switching element, to connect a high-potential-side terminal of the power storage and a high-potential-side terminal of the second capacitor.

3. The power conversion apparatus according to claim 1, wherein
    the power storage is a floating capacitor, and
    the power conversion apparatus further comprises:
        an upper switching element connected between the alternating-current terminal and a high-potential-side terminal; and
        a lower switching element connected between the alternating-current terminal and a low-potential-side terminal, the floating capacitor being connected, between the high-potential-side terminal and the low-potential-side terminal, in parallel with the upper switching element and the lower switching element.

4. The power conversion apparatus according to claim 1, wherein
    the first regenerative rectification circuit is either a circuit including a first regenerative rectification diode or a plurality of first regenerative rectification diodes connected in series and a first resistor connected between a cathode of the first regenerative rectification diode and a low-potential-side terminal of the corresponding first capacitor, or a circuit including a plurality of first regenerative rectification diodes and first resistors respectively connected between cathodes of the first regenerative rectification diodes and low-potential-side terminals of corresponding first capacitors, and the second regenerative rectification circuit is either a circuit including a second regenerative rectification diode or a plurality of second regenerative rectification diodes connected in series and a second resistor connected between an anode of the second regenerative rectification diode and a high-potential-side terminal of the corresponding second capacitor, or a circuit including a plurality of second regenerative rectification diodes and second resistors respectively connected between anodes of the second regenerative rectification diodes and high-potential-side terminals of corresponding second capacitors.

5. The power conversion apparatus according to claim 1, wherein the first capacitor included in a first switch circuit connected on a lowest-potential side of each of the first upper arm circuit and the second upper arm circuit has an electrostatic capacity larger than electrostatic capacities of other first capacitors, and the second capacitor included in a second switch circuit connected on a highest-potential side of each of the first lower arm circuit and the second lower arm circuit has electrostatic capacities larger than electrostatic capacities of other second capacitors.

6. The power conversion apparatus according to claim 1, wherein the power storage includes a first power storage electrically connected, at one end, to the positive direct-current terminal, and a second power storage electrically connected, at one end, to the negative direct-current terminal, the first regenerative rectification circuit is electrically connected to another end of the first power storage, and is configured, if at least one of the first switch circuits includes the first capacitor connected in parallel with the first switching element, to connect the first capacitor in parallel with the first power storage via the first switching element, and the second regenerative rectification circuit is electrically connected to another end of the second power storage, and is configured, if at least one of the second switch circuits includes the second capacitor connected in parallel with the second switching element, to connect the second capacitor in parallel with the second power storage via the second switching element.

7. The power conversion apparatus according to claim 6, wherein the first switch circuit includes the first switching element, a first diode connected, at an anode, to a high-potential-side terminal of the first switching element, and the first capacitor connected between a cathode of the first diode and a low-potential-side terminal of the first switching element, the second switch circuit includes the second switching element, a second diode connected, at a cathode, to a low-potential-side terminal of the second switching element, and the second capacitor connected between an anode of the second diode and a high-potential side terminal of the second switching element, the first regenerative rectification circuit is configured to connect a high-potential-side terminal of the first capacitor and another end of the first power storage, with a direction from a low-potential side toward a high-potential side being a forward direction, and the second regenerative rectification circuit is configured to connect a low-potential-side terminal of the second capacitor of the lower arm and another end of the second power storage, with the direction from the low-potential side toward the high-potential side being the forward direction.

* * * * *